(12) United States Patent
Kajiwara

(10) Patent No.: US 7,302,105 B2
(45) Date of Patent: Nov. 27, 2007

(54) MOVING IMAGE CODING APPARATUS, MOVING IMAGE DECODING APPARATUS, AND METHODS THEREFOR

(75) Inventor: Hiroshi Kajiwara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 931 days.

(21) Appl. No.: 10/620,604

(22) Filed: Jul. 17, 2003

(65) Prior Publication Data

US 2004/0013312 A1    Jan. 22, 2004

(30) Foreign Application Priority Data

Jul. 22, 2002   (JP)   ............................. 2002-212616
Jul. 22, 2002   (JP)   ............................. 2002-212617

(51) Int. Cl.
*G06K 9/36* (2006.01)
*G06K 9/46* (2006.01)

(52) U.S. Cl. ..................... 382/240; 382/233; 382/248

(58) Field of Classification Search ................ 382/233, 382/236, 240, 248; 348/398.1; 375/240.19
See application file for complete search history.

(56) References Cited

U.S. PATENT DOCUMENTS

| | | | | |
|---|---|---|---|---|
| 5,945,930 A | | 8/1999 | Kajiwara | ...................... 341/50 |
| 5,991,447 A | * | 11/1999 | Eifrig et al. | ................. 382/236 |
| 6,028,963 A | | 2/2000 | Kajiwara | ..................... 382/239 |
| 6,031,938 A | | 2/2000 | Kajiwara | ..................... 382/239 |
| 6,101,282 A | | 8/2000 | Hirabayashi et al. | ........ 382/246 |
| 6,233,355 B1 | | 5/2001 | Kajiwara | ..................... 382/238 |
| 6,310,980 B1 | | 10/2001 | Kajiwara | ..................... 382/238 |
| 6,501,859 B1 | | 12/2002 | Kajiwara | ..................... 382/239 |
| 6,549,676 B1 | | 4/2003 | Nakayama et al. | ......... 382/246 |
| 6,560,365 B1 | | 5/2003 | Nakayama et al. | ......... 382/233 |
| 6,665,444 B1 | | 12/2003 | Kajiwara | ..................... 382/240 |
| 6,925,250 B1 | * | 8/2005 | Oshima et al. | ............. 386/111 |
| 2001/0031094 A1 | | 10/2001 | Yamazaki et al. | .......... 382/240 |
| 2002/0061140 A1 | | 5/2002 | Kajiwara | ..................... 382/233 |
| 2003/0007561 A1 | | 1/2003 | Kajiwara | ............... 375/240.11 |
| 2003/0063811 A1 | | 4/2003 | Kajiwara | ..................... 382/240 |
| 2003/0118242 A1 | | 6/2003 | Nakayama et al. | ......... 382/245 |

OTHER PUBLICATIONS

"JPEG2000 Requirements and Profiles Version 6.3", Coding of Still Pictures, WG1 Arles Meeting, WG1 Web Pages, ISO/IEC JTC 1/SC 29/WG1 N1803, Jul. 2000, 41 pages.

* cited by examiner

*Primary Examiner*—Phuoc Tran
(74) *Attorney, Agent, or Firm*—Fitzpatrick, Cella, Harper & Scinto

(57) ABSTRACT

There are provided a moving image coding apparatus and moving image decoding apparatus which allow efficient decoding of an interlaced image from the coded data of a progressive image, and methods for the apparatuses. Non-interlaced moving image data is input from a moving image data input unit (101). Two consecutive frames are discriminated by a switch (102). A line interleaving unit (103) then generates new image data by alternately arranging the line data of the respective frames upon changing the order. A discrete wavelet transform unit (104) performs two-dimensional discrete wavelet transform for this image data to decompose it into seven subbands. Each subband is then coded.

12 Claims, 23 Drawing Sheets

IMAGE TO BE CODED

RANGE OF DATA THAT INFLUENCE VALUE OF l(N)

DATA THAT INFLUENCE VALUE OF l(N)

IMAGE TO BE CODED

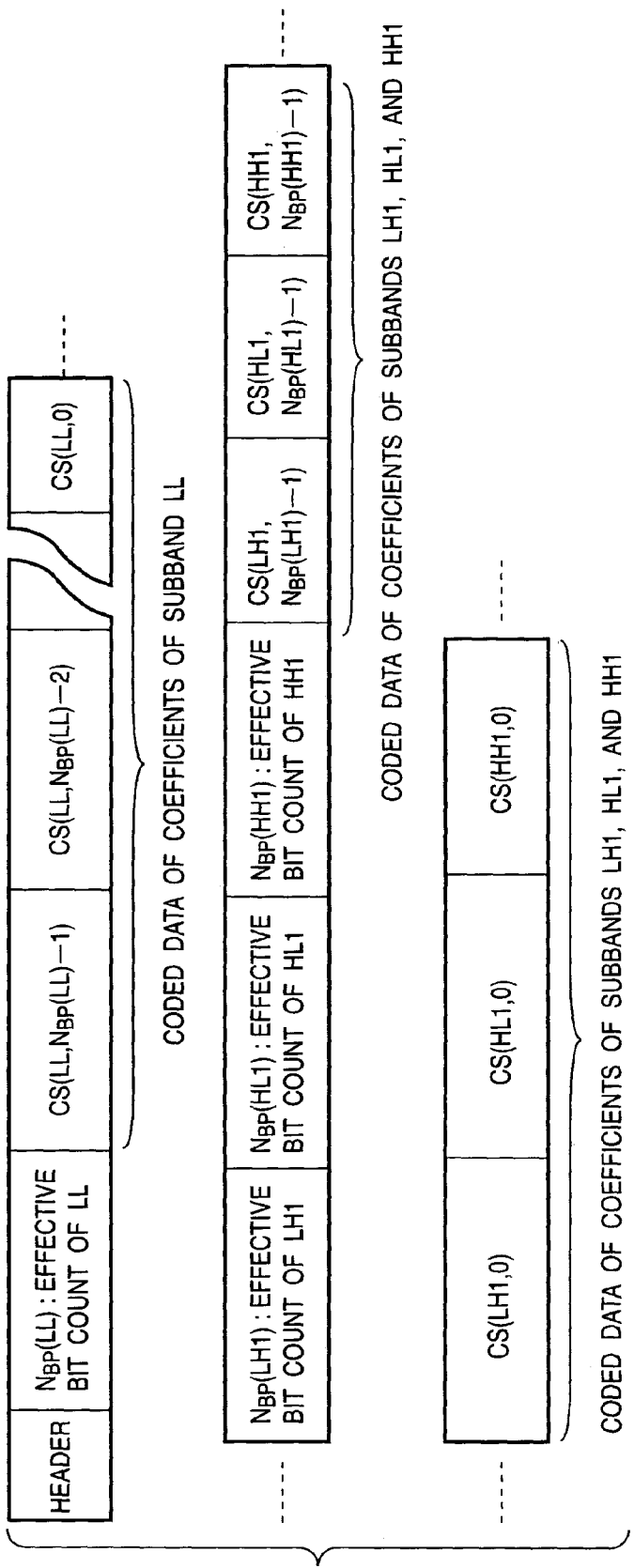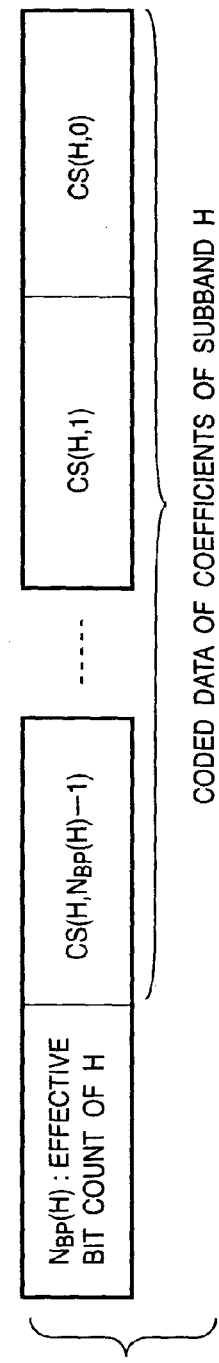

MOVING IMAGE CODING APPARATUS, MOVING IMAGE DECODING APPARATUS, AND METHODS THEREFOR

FIELD OF THE INVENTION

The present invention relates to a moving image coding apparatus and moving image decoding apparatus which properly code and decode moving image data, and methods for the apparatuses.

BACKGROUND OF THE INVENTION

Conventionally, moving image data have been processed as interlaced image data because of various kinds of restrictions. However, along with elimination of conventional restrictions owing to improvement in the performance of image sensing devices, storage devices, display devices, and the like and increasing demand for improvement in the image quality of moving image data, moving image data have been increasingly processed as progressive (noninterlaced) image data. In general, for example, the monitors of personal computers are designed to perform progressive display, and hence moving image are suitably processed as progressive image data in personal computers. This is one of the factors for the tendency described above.

The coding schemes for moving image data can be roughly classified into schemes using interframe correlation and those not using it. These schemes have their own merits and demerits, and which one of them is suitable depends on the application to be used. For example, Motion JPEG is a scheme of independently coding each frame of moving image data while regarding each frame as one still image. This scheme is one of the coding schemes using no interframe correlation. Independently coding each frame makes it possible to decode image data upon selecting the number of frames to be decoded in accordance with the throughput on the decoding side.

Among the coding schemes of independently coding each frame of moving image data, a scheme of coding each frame by using a combination of wavelet transform and bit plane coding has recently attracted a great deal of attention. For example, major features of such a moving image coding scheme are that decoding can be done while the spatial resolution is changed stepwise using the mechanism of subband decomposition in wavelet transform, and decoded pixel precision can be changed stepwise by changing the number of bit planes to be decoded.

JPEG 2000 (ISO/IEC 15444), which is under the process of standardization by ISO/IEC JTC1/SC29/WG1, is also constituted by a combination of wavelet transform and bit plane coding. According to Part 3 of this standard, a file format is defined in a case wherein this scheme is used to code each frame of moving image data.

FIG. 11 is a block diagram showing the arrangement of a conventional image coding apparatus using a coding scheme based on a combination of wavelet transform and bit plane coding. The flow of coding processing in the conventional image coding apparatus will be briefly described with reference to FIG. 11. As shown in FIG. 11, the conventional image coding apparatus includes an image input unit 201, discrete wavelet transform unit 202, coefficient quantization unit 203, bit plane coding unit 204, code sequence forming unit 205, and code output unit 206.

First of all, image data to be coded is input to this apparatus through the image input unit 201. The discrete wavelet transform unit 202 divides the input image data to be coded into a plurality of frequency bands (subbands). Wavelet transform of the image data is generally performed by a method of dividing the data into four subbands first by applying one-dimensional transform processing to the data in the horizontal and vertical directions, and then repeatedly dividing only a low-frequency subband (subband LL).

The coefficient quantization unit 203 quantizes the coefficients of each subband with a quantization step determined for each subband. The bit plane coding unit 204 divides the quantized transform coefficient of each subband into small rectangular areas (to be referred to as "code blocks" hereinafter), and codes the transform coefficients on a code block basis preferentially in the bit plane direction from the most significant bit to the least significant bit. Note that when the respective bits in a bit plane are to be coded, they are classified into several states (contexts) according to information that has already been coded and are coded with different occurrence probability prediction models.

Subsequently, the code sequence forming unit 205 generates a code sequence by arranging the coded code block data generated by the bit plane coding unit 204 in a predetermined order. The generated code sequence is output from the code output unit 206 to the outside of the image coding apparatus.

Assume that the discrete wavelet transform unit 202 performs two-dimensional wavelet transform twice to sequentially code the coefficients of the respective subbands from a low-frequency subband LL to a high-frequency subband HH2, and transmits the resultant data to the image decoding apparatus. In this case, on the decoding side, when the coefficients of the subband are received, a reconstructed image with a resolution ¼ that of the original image can be obtained. When the coefficients of the subbands LL, LH1, HL1, and HH1 are received, a reconstructed image with a resolution ½ that of the original image can be obtained. In addition, when coefficients up to the coefficients of the subbands LH2, HL2, and HH2 are received, a reconstructed image with the original resolution can be obtained. In this manner, an image can be decoded while the resolution is gradually increased.

When the coded bit plane data of the respective code blocks which are obtained by the bit plane coding unit 204 are transmitted from the most significant bit to the least significant bit, the decoding side can reconstruct the transform coefficients of the respective subbands while gradually increasing the resolution. This makes it possible to decode an image with low image quality in the initial state of transmission and decode an image with high image quality as transmission progresses.

There is still demand for image display on a TV set that is not designed to process moving image data as progressive image data. In this case, an interlaced image is required to be generated from a progressive image and output.

In such a case, in the above conventional image coding scheme and image decoding scheme, one-frame image data is decoded first, and then even or odd lines must be extracted and output as fields. That is, the data of lines that are not required to be output must also be decoded.

SUMMARY OF THE INVENTION

The present invention has been proposed to solve the conventional problems, and has as its objects to provide an moving image coding apparatus and moving image decoding apparatus which can efficiently decode an interlaced image from the coded data of a progressive image, and methods for the apparatuses.

In order to solve the above problems, according to the present invention, there is provided a moving image coding apparatus for coding noninterlaced moving image data, comprising input means for inputting noninterlaced moving image data, generating means for generating new image data by arranging line data of two consecutive frames in a predetermined order, subband decomposing means for frequency-transforming the image data to decompose the data into a plurality of subbands, coding means for coding the image data decomposed into the plurality of subbands, and output means for outputting the coded image data.

The moving image coding apparatus according to the present invention is characterized in that the subband decomposing means decomposes the image data into a plurality of subbands by using two-dimensional discrete wavelet transform.

The moving image coding apparatus according to the present invention is characterized in that the generating means generates new image data by alternately arranging the line data of the two frames upon changing the order.

The moving image coding apparatus according to the present invention is characterized in that the apparatus further comprises storage means for temporarily storing the line data of one of the two frames, and the generating means generates new image data by using the line data of one frame of the moving image data which is directly input and the line data of the frame stored in the storage means.

The moving image coding apparatus according to the present invention is characterized in that the generating means arranges an odd line of an odd frame and an even line of an even frame on the same line, and arranges an even line of the odd frame and an odd line of the even frame on the same line.

In addition, according to the present invention, there is provided a moving image decoding apparatus for decoding interlaced image data from coded data of image data in which line data of two consecutive frames are arranged in a predetermined order, comprising input means for inputting the coded data, subband decoding means for decoding a predetermined subband from the coded data, subband combining means for reconstructing image data by combining decoded subbands, frame decomposing means for decomposing the reconstructed image data into odd and even fields, and output means for outputting decomposed frames.

The moving image decoding apparatus according to the present invention is characterized in that the apparatus further comprises designation means for designating whether coded data of image data in which line data of two consecutive frames are arranged in a predetermined order is decoded by interlacing or noninterlacing, if it is designated to perform decoding by interlacing, the input means inputs only coded data containing no predetermined high-frequency component; and if it is designated to perform decoding by noninterlacing, the input means inputs coded data associated with all frequency components.

Furthermore, according to the present invention, there is provided a moving image coding apparatus for coding noninterlaced moving image data, comprising input means for inputting noninterlaced moving image data, first subband decomposing means for frequency-transforming a predetermined frame of the moving image data to decompose the data into a plurality of subbands, second subband decomposing means for frequency-transforming a frame next to the frame by a method different from that used by the first subband decomposing means to decompose the frame into a plurality of subbands, coding means for coding the frame decomposed into a plurality of subbands, and output means for outputting the coded frame.

The moving image coding apparatus according to the present invention is characterized in that in the first and second subband decomposing means, decomposition filters applied in first subband decomposition in the vertical direction are shifted from each other by one line.

Each of the first and second subband decomposing means decomposes a frame into a plurality of subbands by using two-dimensional discrete wavelet transform.

The moving image coding apparatus according to the present invention is characterized in that the first and second subband decomposing means frequency-transform a target frame in the vertical direction to decompose the frame into two subbands, and decompose one subband the same number of times in the horizontal and vertical directions, thereby decomposing the subband into 3n+2 subbands.

In addition, according to the present invention, there is provided a moving image coding apparatus for coding noninterlaced moving image data, comprising input means for inputting noninterlaced moving image data, line shift means for generating a frame by shifting a frame next to a predetermined frame of the moving image data by one-line data in the vertical direction, subband decomposing means for frequency-transforming the frame shifted from the predetermined frame by one-line data to decompose the frame into a plurality of subbands, coding means for coding the frame decomposed into a plurality of subbands, and output means for outputting the coded frame.

The moving image coding apparatus according to the present invention is characterized in that the subband decomposing means decomposes a frame into a plurality of subbands by using two-dimensional discrete wavelet transform.

Furthermore, according to the present invention, there is provided a moving image decoding apparatus for decoding interlaced image data from moving image data coded by the moving image coding apparatus described above, comprising input means for inputting coded moving image data, subband decoding means for decoding a predetermined subband from the coded moving image data, first subband combining means for combining predetermined subbands decoded from coded data of a predetermined frame to reconstruct odd fields associated with the predetermined frame, second subband combining means for combining predetermined subbands decoded from coded data of a frame next to the predetermined frame to reconstruct even fields associated with the predetermined frame, and output means for outputting the reconstructed odd or even fields associated with the predetermined frame.

The moving image decoding apparatus according to the present invention is characterized in that the apparatus further comprises designation means for designating whether coded data is decoded by interlacing or noninterlacing, if decoding by interlacing is designated, the input means inputs only coded data containing no predetermined high-frequency component, and if decoding by noninterlacing is designated, the input means inputs all coded data, the first subband combining means combines subbands decoded from coded data associated with an input predetermined frame to reconstruct the predetermined frame, and the second subband combining means combines subbands decoded from coded data associated with a frame next to the predetermined frame to reconstruct the next frame.

In addition, according to the present invention, there is provided a moving image decoding apparatus for decoding interlaced image data from moving image data coded by the moving image coding apparatus described above, comprising input means for inputting the coded data associated with a predetermined frame of the moving image data and a frame next to the predetermined frame, subband decoding means for decoding a predetermined subband from the coded data, subband combining means for reconstructing the predetermined frame and the frame next to the predetermined frame by combining predetermined subbands decoded from the coded data, line shift means for shifting line data of the frame next to the predetermined frame by one line, and output means for outputting an odd field from the predetermined frame, and outputting an even field from the next frame shifted by one line.

The moving image decoding apparatus according to the present invention is characterized in that the apparatus further comprises designation means for designating whether the coded data is decoded by interlacing or noninterlacing, and if decoding by interlacing is designated, the input means inputs only coded data containing no predetermined high-frequency component.

The moving image decoding apparatus according to the present invention is characterized in that the apparatus further comprises designation means for designating whether the coded data is decoded by interlacing or noninterlacing, and if decoding by noninterlacing is designated, the input means inputs all coded data, and the output means outputs a predetermined frame decoded from input coded data and a frame next to the predetermined frame.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 22A and 22B are views showing the structures of a field code sequence and progressive additional code sequence which correspond to one frame data generated by a code sequence forming unit 1403.

DETAILED DESCRIPTION OF THE PREFERRED EMBODIMENTS

A moving image coding apparatus and moving image decoding apparatus according to an embodiment of the present invention will be described below with reference to the accompanying drawings.

First Embodiment

Figure 1:
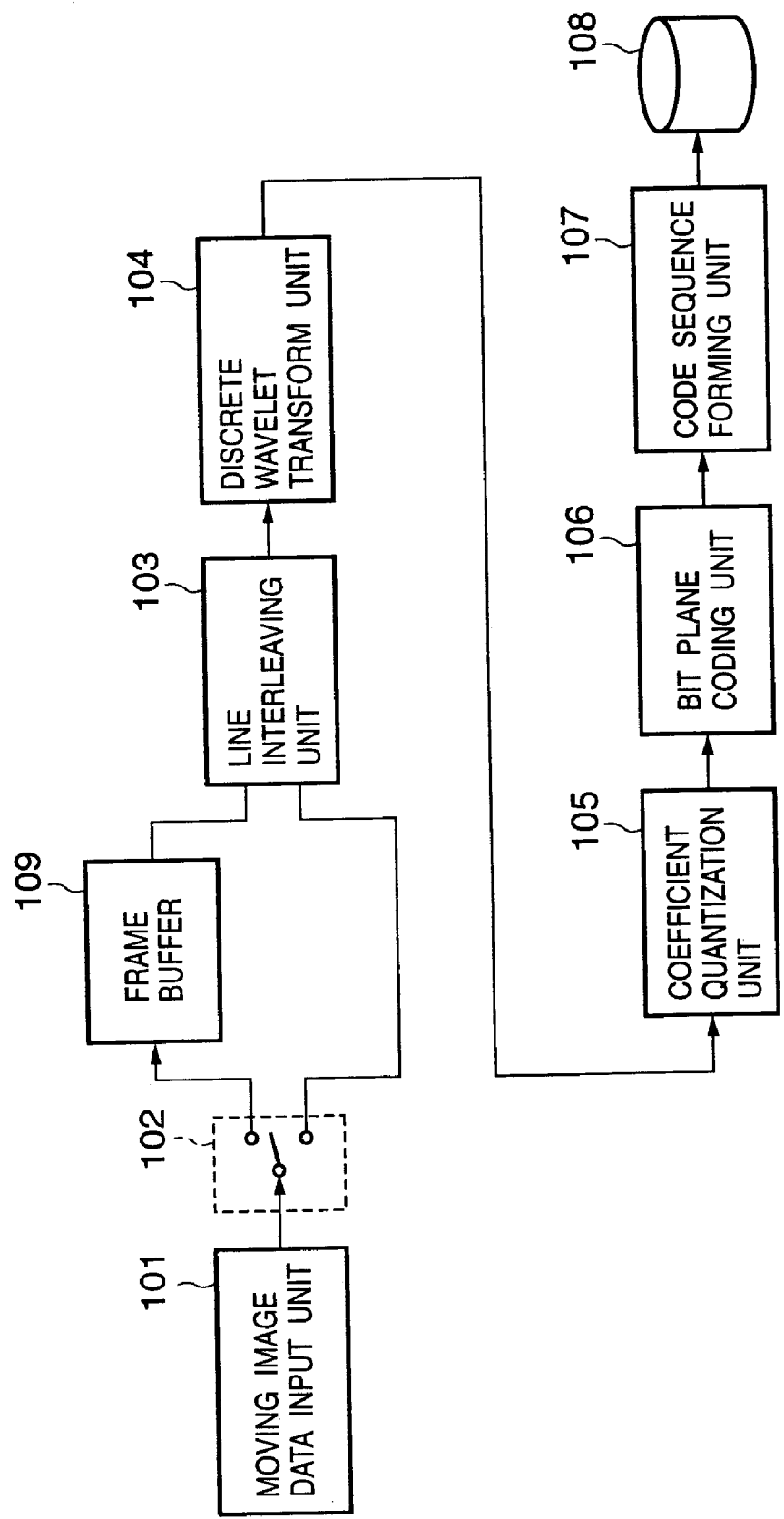
FIG. 1 is a block diagram showing the arrangement of a moving image coding apparatus according to the first embodiment of the present invention.

FIG. 1 is a block diagram showing the arrangement of a moving image coding apparatus according to the first embodiment of the present invention. As shown in FIG. 1, the moving image coding apparatus according to the first embodiment includes a moving image data input unit 101, switch 102, line interleaving unit 103, discrete wavelet transform unit 104, coefficient quantization unit 105, bit plane coding unit 106, code sequence forming unit 107, secondary storage unit 108, and frame buffer 109.

The operation of each constituent element of the moving image coding apparatus according to the first embodiment shown in FIG. 1 will be described in detail next. Assume that in this embodiment, monochrome moving image data which is constituted by 60 frames per sec, has a luminance value of eight bits per pixel, and corresponds to four sec (a total of 240 frames) is input into the moving image coding apparatus to be coded. That is, in the moving image coding apparatus according to this embodiment, moving image data constituted by 60 frames per sec and input from the moving image data input unit 101 is coded on a frame basis, and the resultant code data sequence is finally stored in the secondary storage unit 108.

First of all, moving image data which is constituted by 60 frames per sec and corresponds to four sec is input from the moving image data input unit 101. The moving image data input unit 101 is, for example, the image sensing portion of a digital camera or the like and can be realized by an image sensing device such as a CCD and various kinds of image adjustment circuits for gamma correction, shading correction, and the like. The moving image data input unit 101 sends the input moving image data frame by frame to the switch 102. For the sake of convenience, in the following description, the respective frame data are sequentially assigned numbers starting from 1 to be identified as, for example, frame 1, frame 2, . . . In addition, the position (coordinate) of each frame in the horizontal direction is represented by x; the position of each frame in the vertical direction, y, and the pixel value at a position (x, y), P(x, y).

The switch 102 sends the frame data input from the moving image data input unit 101 either to the frame buffer 109 or to the line interleaving unit 103 directly by switching connection in accordance with the frame number. In this embodiment, the switch 102 is connected to the frame buffer 109 when the input frame is an odd frame, and is connected to the line interleaving unit 103 when the input frame is an even frame. The data of each odd frame is stored in the frame buffer 109.

The line interleaving unit 103 alternately arranges the odd frame data stored in the frame buffer 109 and the even frame data input through the switch 102 line by line. In this case, on each odd line of each frame, an odd frame line and even frame line are arranged in the order named, whereas on each even line of each frame, an even frame line and odd frame line are arranged in the order named, thereby generating an image having lines twice in number the original image in the vertical direction. This image data is output to the discrete wavelet transform unit 104.

That is, the present invention is characterized by further including a storage step of temporarily storing the line data of one of two consecutive frames in the frame buffer 109, and by causing the line interleaving unit 103 to generate new image data by using the line data of one frame, of the moving image data, which is directly input and the line data of the other frame stored in the frame buffer 109.

Figure 2:
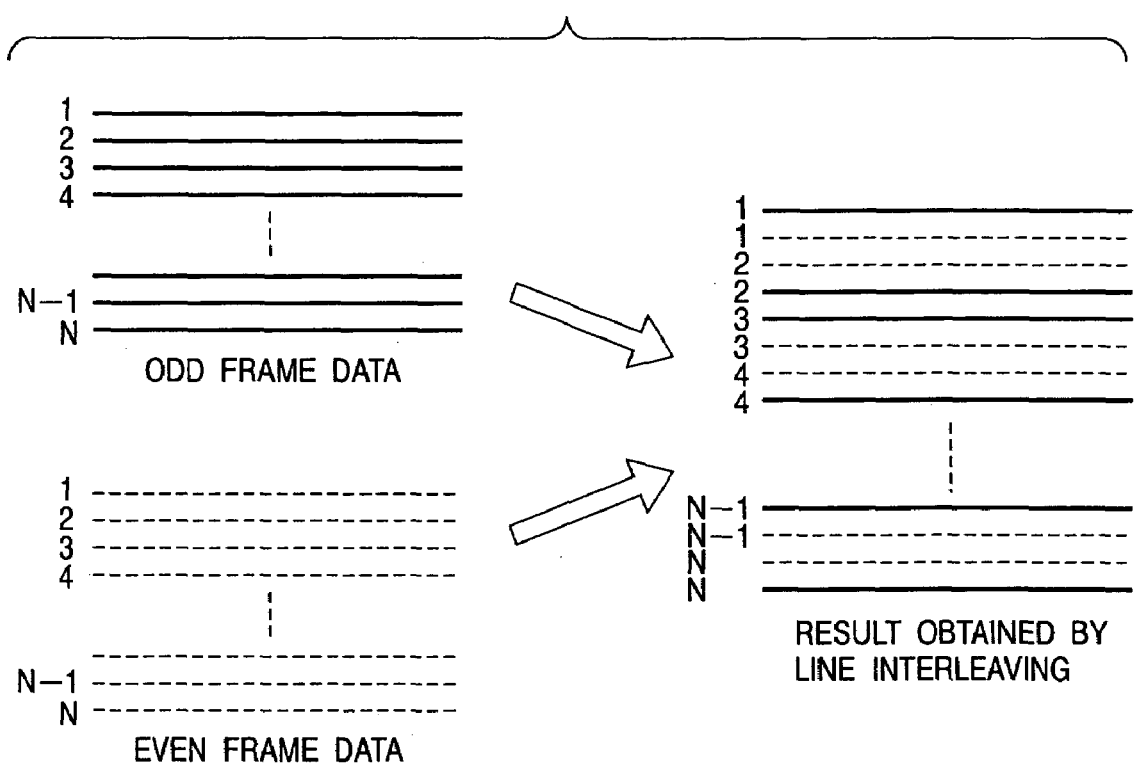
FIG. 2 is a view for explaining the result obtained by line interleaving of odd frame data and even frame data.

FIG. 2 is a view for explaining the result obtained by line interleaving of odd frame data and even frame data. Referring to FIG. 2, each solid line represents one line of odd frame data; and each dotted line, one line of even frame data. The numbers on the left ends of the lines indicate the line numbers in the odd and even frames. Note that the line numbers range from 1 indicating the first line to N indicating the last line. In addition, the position (coordinate) of image data in the horizontal direction, which is generated by the line interleaving unit 103, is represented by x; the position of the image data in the vertical direction, y; and the pixel value at coordinates (x, y), P'(x, y).

That is, the present invention is characterized in that the line interleaving unit 103 generates new image data by alternately arranging the respective line data of two consecutive frames while changing the order of the line data.

Figure 3C:
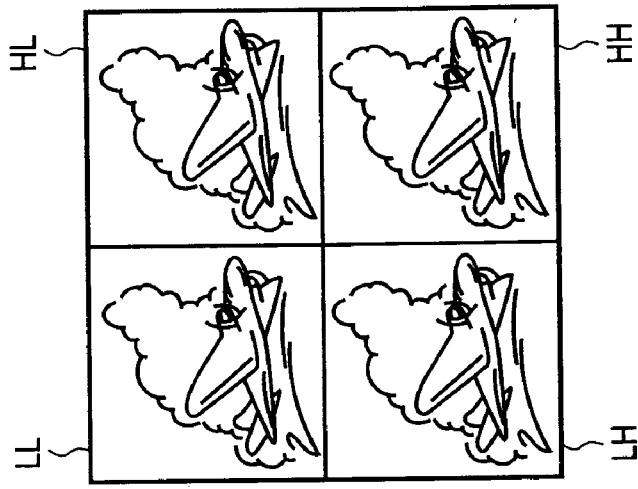
FIGS. 3A, 3B, and 3C are views for explaining the subbands of an image to be coded, which are processed by two-dimensional discrete wavelet transform.
Figure 3B:
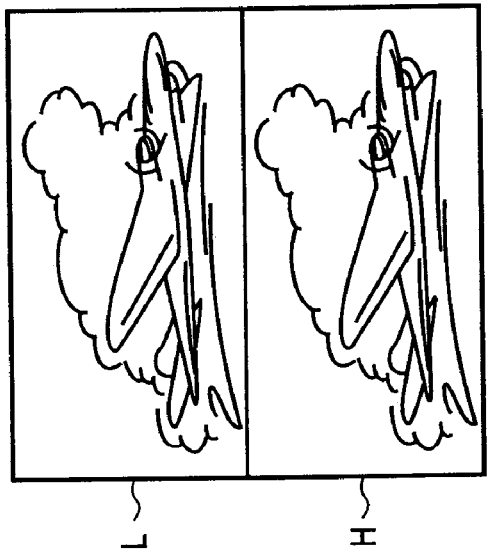
Figure 3A:
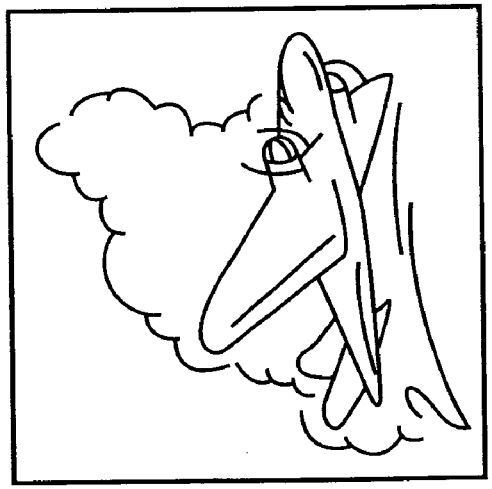

The image data generated by the line interleaving unit 103 are properly stored in an internal buffer (not shown) in the discrete wavelet transform unit 104 to be subjected to two-dimensional discrete wavelet transform. Two-dimensional discrete wavelet transform is implemented by applying one-dimensional discrete wavelet transform in the horizontal and vertical directions. FIGS. 3A, 3B, and 3C are views for explaining the subbands of an image to be coded which is processed by two-dimensional discrete wavelet transform.

First of all, one-dimensional discrete wavelet transform is applied to an image to be coded like the one shown in FIG. 3A in the vertical direction to decompose the image to be coded into a low-frequency subband L and high-frequency subband H. One-dimensional discrete wavelet transform is then applied to each subband in the horizontal direction to decompose the respective subbands into four subbands LL, HL, LH, and HH.

Figure 4:
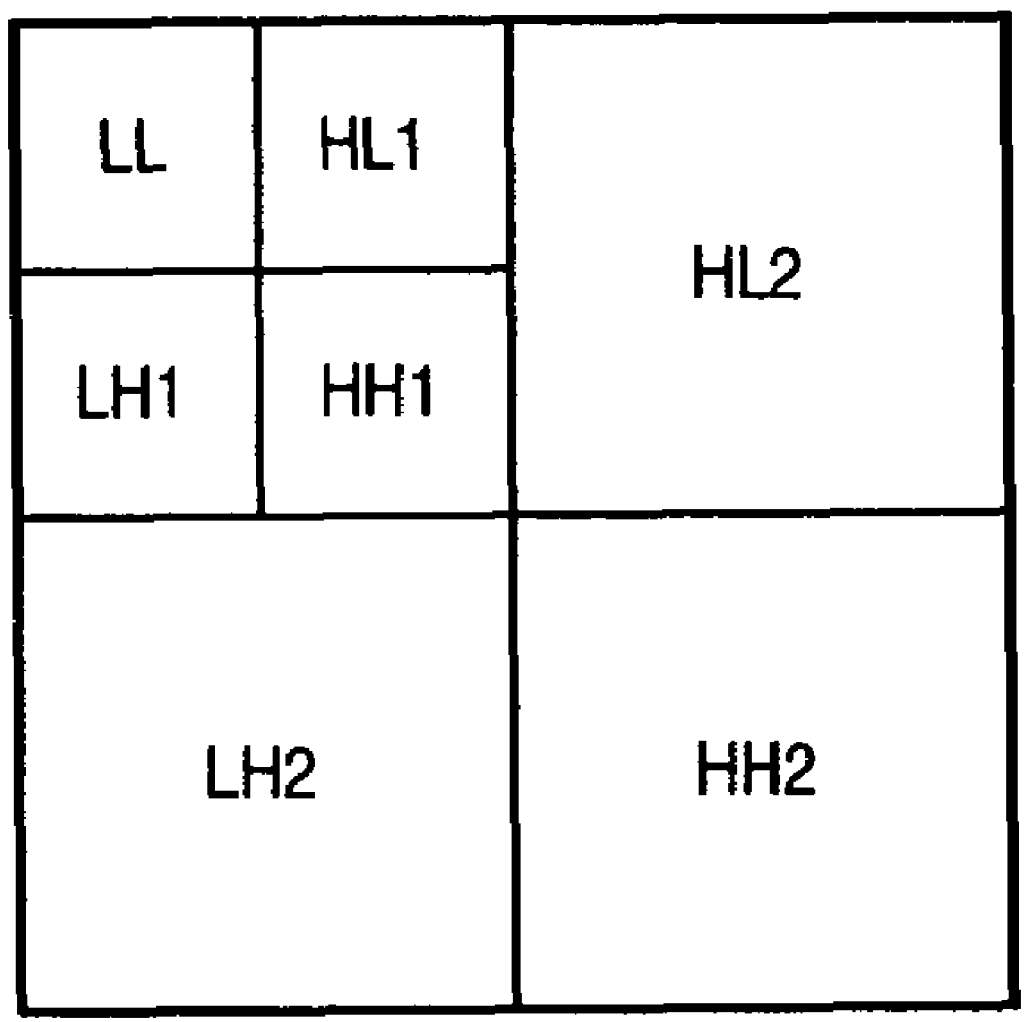
FIG. 4 is a view for explaining seven subbands obtained by performing two-dimensional discrete wavelet transform twice.

The discrete wavelet transform unit 104 in this embodiment repeatedly applies two-dimensional discrete wavelet transform to the subband LL obtained by the above one-dimensional discrete wavelet transform. This makes it possible to decompose the image to be coded into seven subbands LL, LH1, HL1, HH1, LH2, HL2, and HH2. FIG. 4 is a view for explaining the seven subbands obtained by performing two-dimensional discrete wavelet transform twice. That is, the present invention is characterized in that the discrete wavelet transform unit 104 decomposes image data into a plurality of subbands by using two-dimensional discrete wavelet transform.

In this embodiment, a coefficient in each subband is represented by $C(S, x, y)$ where S represents the type of subband, and (x, y) represents a coefficient position (coordinates) in the horizontal and vertical directions when the coefficient position at the upper left corner in each subband is represented by (0, 0).

In this embodiment, the discrete wavelet transform unit 104 performs one-dimensional wavelet transform for N one-dimensional signals $x(n)$ (where n is an integer from 0 to N−1) using equations (1) and (2):

$$h(n)=x(2n+1)-\text{floor}\{(x(2n)+x(2n+2))/2\} \qquad (1)$$

$$l(n)=x(2n)+\text{floor}\{(h(n-1)+h(n)+2)/4\} \qquad (2)$$

where $h(n)$ is a coefficient of a high-frequency subband, $l(n)$ is a coefficient of a low-frequency subband, and floor$\{R\}$ is the maximum integral value that does not exceed a real number R. Note that values $x(n)$ at the two ends (n<0 and n>N−1) of a one-dimensional signal $x(n)$ which are required for the calculation of equations (1) and (2) are obtained in advance from the value of the one-dimensional signal $x(n)$ (n=0 to N−1) by a known method.

The coefficient quantization unit 105 quantizes the coefficient $C(S, x, y)$ of each subband, generated by the discrete wavelet transform unit 104, by using a quantization step delta(S) determined for each subband. Letting $Q(S, x, y)$ be a quantized coefficient value, the quantization processing performed by the coefficient quantization unit 105 can be represented by:

$$Q(S, x, y) = \text{sign}\{C(S, x, y)\} \times \text{floor}\{|C(S, x, y)|/\text{delta}(S)\} \quad (3)$$

where sign{I} is a function representing the sign of an integer I, which returns 1 when I is positive, and −1 when I is negative, and floor{R} is the maximum integral value that does not exceed a real number R.

The bit plane coding unit 106 codes the coefficient value Q(S, x, y) quantized by the coefficient quantization unit 105. Various techniques have been proposed as coding techniques, e.g., a method of forming the coefficients of each subband into blocks and coding the coefficients on a block basis, thereby facilitating random access. In this case, for the sake of descriptive convenience, assume that coding is performed on a subband basis.

The quantized coefficient value Q(S, x, y) (to be simply referred to as a "coefficient value" hereinafter) of each subband is coded by expressing the absolute value of the coefficient value Q(S, x, y) in the subband in natural binary notation and performing binary arithmetic coding preferentially in the bit plane direction from the most significant bit to the least significant bit. When the coefficient value Q(S, x, y) of each subband is expressed in natural binary notation, the nth bit from the least significant bit is expressed in Qn(x, y). Note that a variable n representing a bit position in a binary number is termed a bit plane number, and that the bit plane number n of the LSB (Least Significant Bit) is 0.

Figure 5:
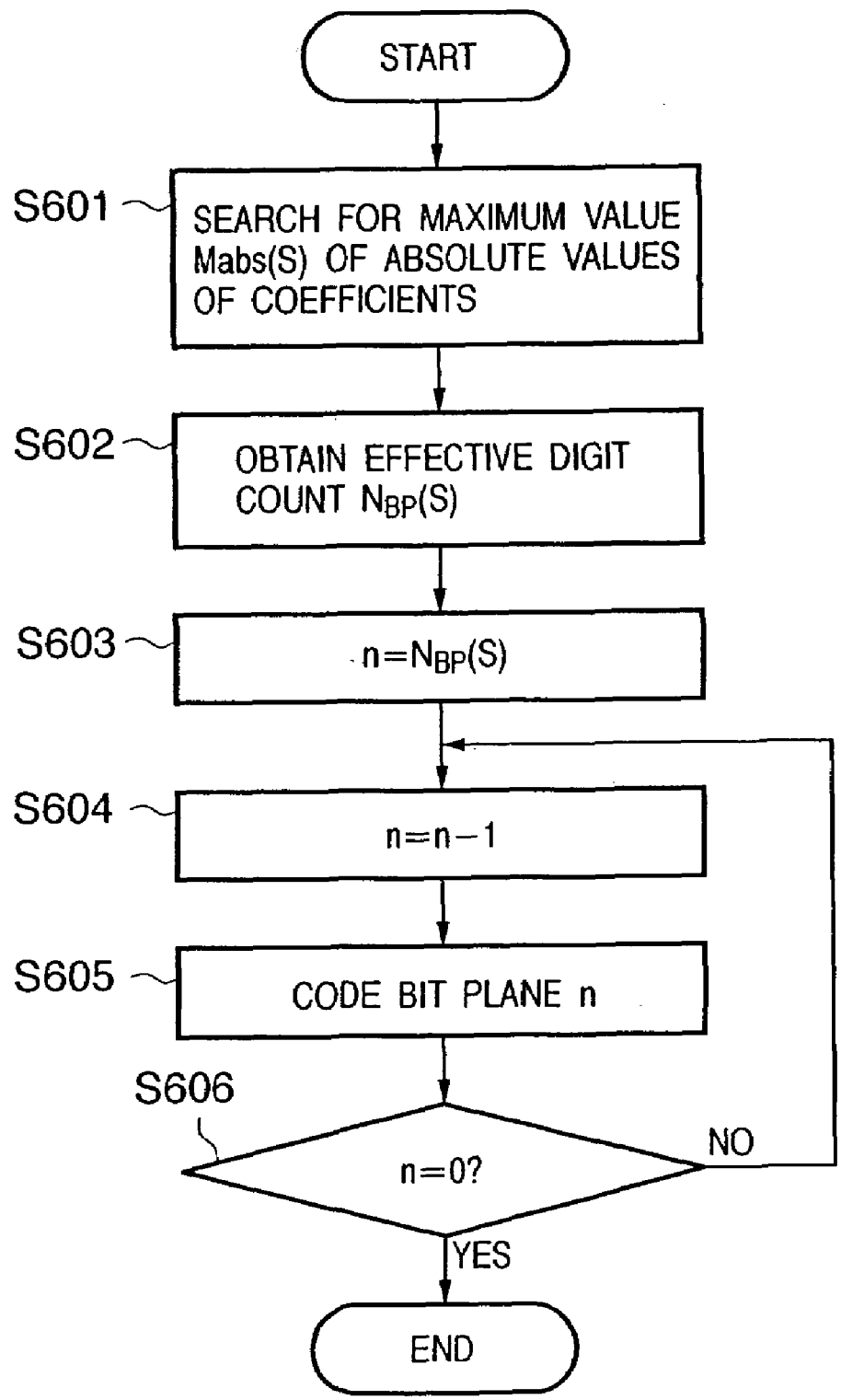
FIG. 5 is a flow chart for explaining a procedure for coding a subband S using a bit plane coding unit 106.

FIG. 5 is a flow chart for explaining a procedure for coding a subband S in the bit plane coding unit 106. As shown in FIG. 5, first of all, the absolute values of the coefficients in the subband S to be coded are checked to obtain a maximum value Mabs(S) (step S601). A bit count $N_{BP}(S)$ which is required to express Mabs(S) in binary notation so as to express the absolute values of the coefficients in the subband is obtained by using equation (4) (step S602):

$$N_{BP}(S) = \text{ceil}\{\log_2(Mabs(S)+1)\} \quad (4)$$

where ceil{R} is the minimum integral value equal to or more than the real number R.

The effective bit count $N_{BP}(S)$ is substituted into the bit plane number n (step S603). Subsequently, n−1 is obtained by subtracting 1 from the bit plane number n, and is substituted into n (step S604).

The nth bit plane is coded by using a binary arithmetic code (step S605). Assume that this embodiment uses an MQ-Coder as an arithmetic code. A procedure for coding a binary symbol generated under a certain condition (context) S or an initialization procedure and termination procedure for arithmetic coding processing are described in detail in international standards ISO/IEC 15444-1 for still images, and hence a description thereof will be omitted.

Assume that in this embodiment, an arithmetic coder is initialized at the start of coding of each bit plane, and termination processing for the arithmetic coder is performed at the end of coding. In addition, the sign of a coefficient is expressed in 0 or 1 and arithmetically coded immediately after "1" of each coefficient which is to be coded first. In this case, 0 represents a positive sign; and 1, a negative sign. Assume that a coefficient is −5, and the effective bit count $N_{BP}(S)$ of the subband S to which the coefficient belongs is 6. In this case, the absolute value of the coefficient is expressed as the binary number 000101, which is coded from the most significant bit to the least significant bit by coding each bit plane. At the time of coding of the second bit plane (at the fourth bit from the most significant bit in this case), first "1" is coded. Immediately after this coding, the sign "1" is arithmetically coded.

It is then checked whether the bit plane number n is 0 (step S606). If n is 0, i.e., the LSB plane is coded in step S605 (YES), coding processing for the subband is terminated. Otherwise (NO), the flow returns to step S604.

With the above processing, all the coefficients of the subband S can be coded, and a code sequence CS(S, n) corresponding to each bit plane n is generated. The generated code sequence CS(S, n) is sent to the code sequence forming unit 107 and temporarily stored in a buffer (not shown) in the code sequence forming unit 107.

When a bit plane coding unit 106 completely codes the coefficients of all the subbands, and all the code sequences are stored in the internal buffer, the code sequence forming unit 107 reads out code sequences from the internal buffer in a predetermined order. The code sequence forming unit 107 then inserts necessary additional information in the code sequences to generate two code sequences corresponding to one frame, and stores them in a secondary storage unit 108.

The final code sequence generated by the code sequence forming unit 107 is constituted by a header and coded data hierarchically arranged at three levels, namely level 0, level 1, and level 2. In this case, the coded data at level 0 is constituted by code sequences from CS(LL, $N_{BP}$(LL)−1) to CS(LL, 0) obtained by coding the coefficients of the subband LL.

Figure 6:
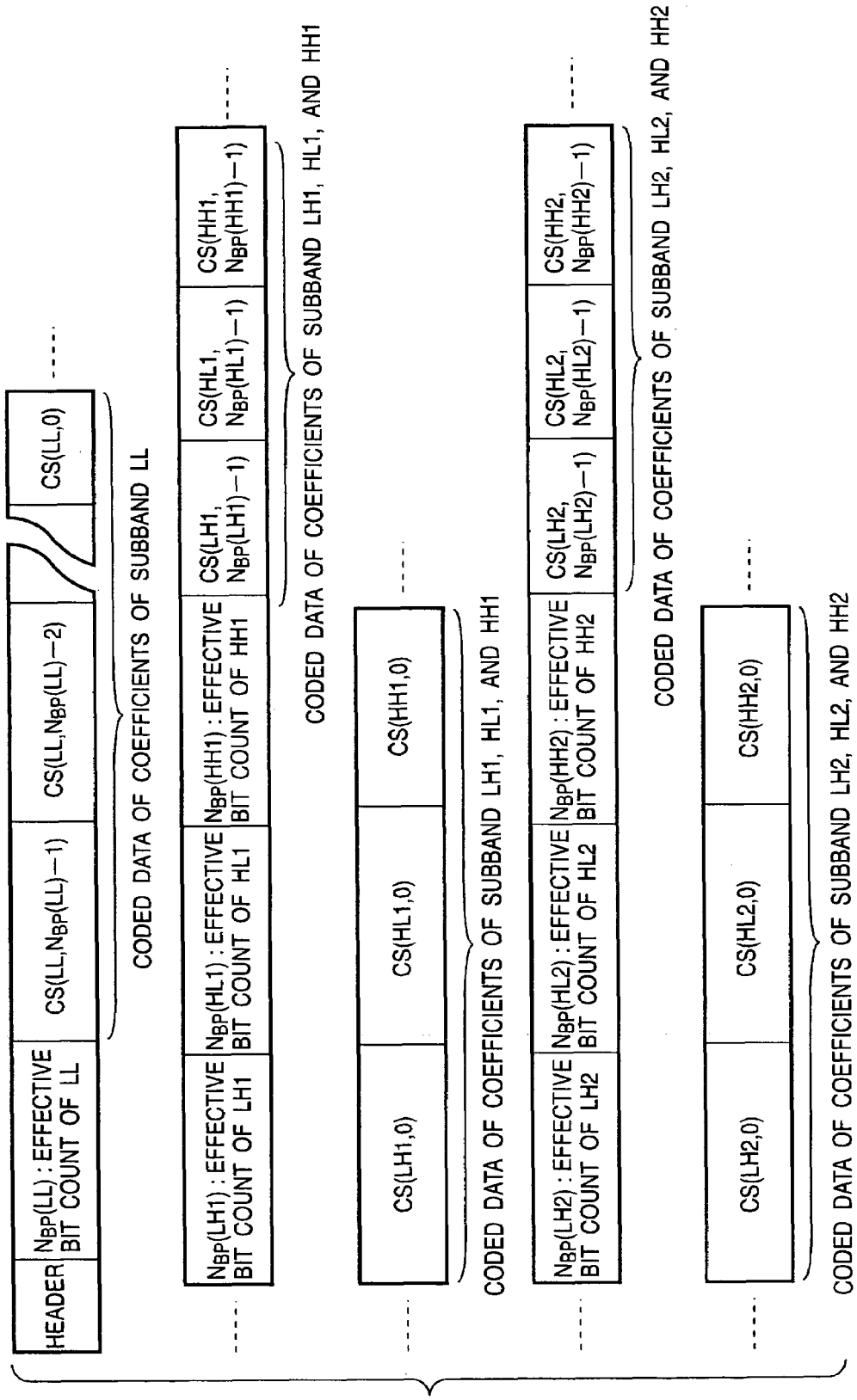
FIG. 6 is a view showing the detailed structure of a code sequence corresponding to one frame data generated by a code sequence forming unit 107.

The coded data at level 1 is constituted by code sequences from CS(LH1, $N_{BP}$(LH1)−1) to CS(LH1, 0), code sequences CS(HL1, $N_{BP}$(HL1)−1) to CS(HL1, 0), and code sequences CS(HH1, $N_{BP}$(HH1)−1) to CS(HH1, 0) obtained by coding the coefficients of the subbands LH1, HL1, and HH1. The coded data at level 2 is constituted by code sequences from CS(LH2, $N_{BP}$(LH2)−1) to CS(LH2, 0), code sequences CS(HL2, $N_{BP}$(HL2)−1) to CS(HL2, 0), and code sequences CS(HH2, $N_{BP}$(HH2)−1) to CS(HH2, 0) obtained by coding the coefficients of the subbands LH2, HL2, and HH2. FIG. 6 is a view showing the detailed structure of a code sequence corresponding to one frame data, which is generated by the code sequence forming unit 107.

That is, the present invention is associated with a moving image coding technique of coding noninterlaced moving image data and has the following characteristic feature. First of all, the line data of two consecutive frames in noninterlaced moving image data are alternately arranged a predetermined number of lines at a time to generate new image data. The image data is then frequency-transformed to be decomposed into a plurality of subbands, and the image data decomposed into the plurality of subbands is then coded.

Figure 7:
FIG. 7 is a view showing an example of the code sequence of each frame stored in a secondary storage unit 108.

The secondary storage unit 108 stores the code sequence of each frame which is generated by the code sequence forming unit 107. The secondary storage unit 108 can be realized by, for example, a storage unit such as a hard disk or memory. FIG. 7 is a view showing an example of the code sequence of each frame stored in the secondary storage unit 108. In storing code sequences in the secondary storage unit 108, they may be arranged in frame order to be stored as one file as shown in FIG. 7, or the coded data of the respective frames may be stored as different files.

The present invention is not limited to this, and may be applied to a case wherein a luminance value is expressed by the number of bits, e.g., 4, 10, or 12, other than 8, or color image data is used, whose pixel is expressed by a plurality of color components such as R, G, and B components, Y, Cr, and Cb components, or C, M, Y, and K components. The present invention can also be applied to a case wherein when multilevel information representing the state of each pixel in an image area is to be coded or decoded, for example, the color of each pixel is represented by an index value for a color table, and the index value is coded or decoded. Furthermore, the capture time and the number of frames captured per sec are not limited to those in the embodiment described above.

Second Embodiment

Figure 8:
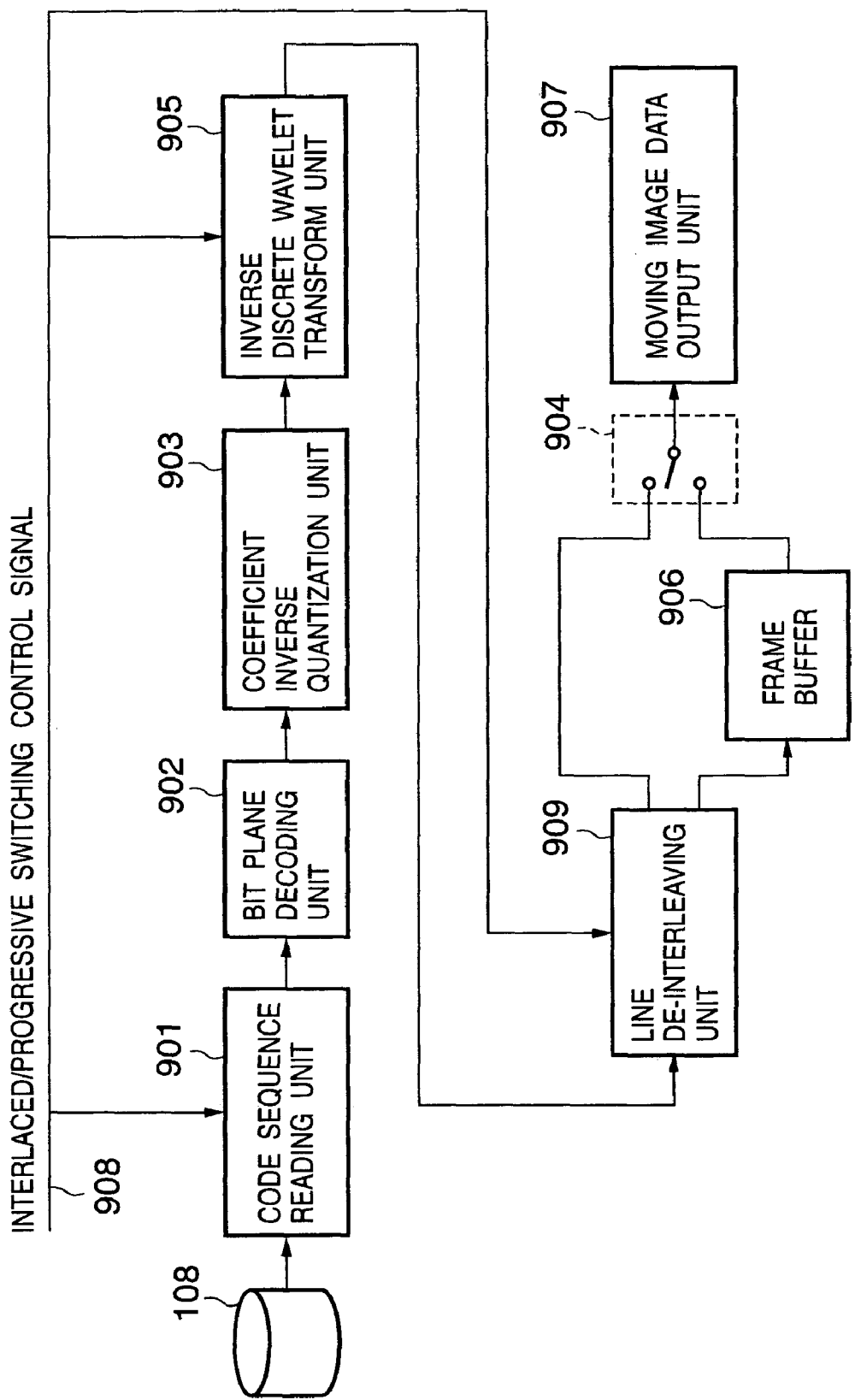
FIG. 8 is a block diagram showing the arrangement of a moving image decoding apparatus for decoding the coded data generated by the moving image coding apparatus according to the first embodiment of the present invention.

FIG. 8 is a block diagram showing the arrangement of a moving image decoding apparatus for decoding coded data generated by the moving image coding apparatus according to the first embodiment of the present invention. The same reference numerals as in FIG. 1 denote the same parts (secondary storage unit 108) in FIG. 8, and a description thereof will be omitted. As shown in FIG. 8, the moving image decoding apparatus according to this embodiment includes a code sequence reading unit 901, bit plane decoding unit 902, coefficient inverse quantization unit 903, switch 904, inverse discrete wavelet transform unit 905, frame buffer 906, line de-interleaving unit 909, moving image data output unit 907, signal line 908, and secondary storage unit 108.

An operation procedure for the moving image decoding apparatus according to this embodiment which decodes coded data generated by the moving image coding apparatus will be described below with reference to FIG. 8.

The moving image decoding apparatus according to this embodiment can select and play back an interlaced image or progressive image in accordance with an interlaced/progressive (noninterlaced) switching control signal input from the outside of the apparatus through the signal line 908. In this embodiment, every signal value input through the signal line 908 is either "0" or "1". Assume that when "0" is input, an interlaced image is output, whereas when "1" is input, a progressive image is output.

Moving image data is decoded frame by frame in coded data. The code sequence reading unit 901 reads out the coded data of a target frame from the coded data stored in the secondary storage unit 108 and stores the read data in an internal buffer (not shown). At this time, if the interlaced/progressive switching control signal received through the signal line 908 is "0", i.e., outputting of an interlaced image is selected, reading of the coded data of subbands LH2 and HH2 of the coded data of the frame is inhibited.

The present invention has therefore the following characteristic feature. It is designated whether the coded data of image data in which the line data of two consecutive frames are arranged in a predetermined order is decoded into interlaced image data or noninterlaced image data. When interlaced decoding is designated, subbands are decoded by using only coded data containing no predetermined high-frequency components. When noninterlaced decoding is designated, subbands are decoded by using decoded data associated with all the frequency components.

The bit plane decoding unit 902 reads out coded data from the internal buffer in the code sequence reading unit 901 in subband order, and decodes the quantized transform coefficient data Q(S, x, y). The processing in the bit plane decoding unit 902 pairs up with the bit plane coding unit 106 shown in FIG. 1.

That is, the bit plane coding unit 106 performs binary arithmetic coding of the respective bits of the absolute value of a coefficient from the most significant bit plane to the least significant bit plane with a predetermined context. Likewise, the bit plane decoding unit 902 decodes the binary arithmetic coded data from the most significant bit plane to the least significant bit plane with the same context as in coding, thereby reconstructing the respective bits of the coefficient. In addition, the arithmetic code of the sign of the coefficient is decoded by using the same context at the same timing as in coding.

The coefficient inverse quantization unit 903 reconstructs a coefficient C(S, x, y) of each subband from a quantization step delta(S) determined for each subband and the coefficient value Q(S, x, y) decoded and quantized by the bit plane decoding unit 902.

The inverse discrete wavelet transform unit 905 reconstructs the data of a frame by performing transform inverse to wavelet transform processing in the discrete wavelet transform unit 104 in FIG. 1. In this case, if the control signal input through the signal line 908 is "1", the subband LL shown in FIG. 3C is reconstructed from the coefficients of subbands LL, HL1, LH1, and HH1, and the data is reconstructed with the same size as that of the original frame data as shown in FIG. 3A from the subband LL and subbands LH2, HL2, and HH2 through the step shown in FIG. 3B.

Figure 9:
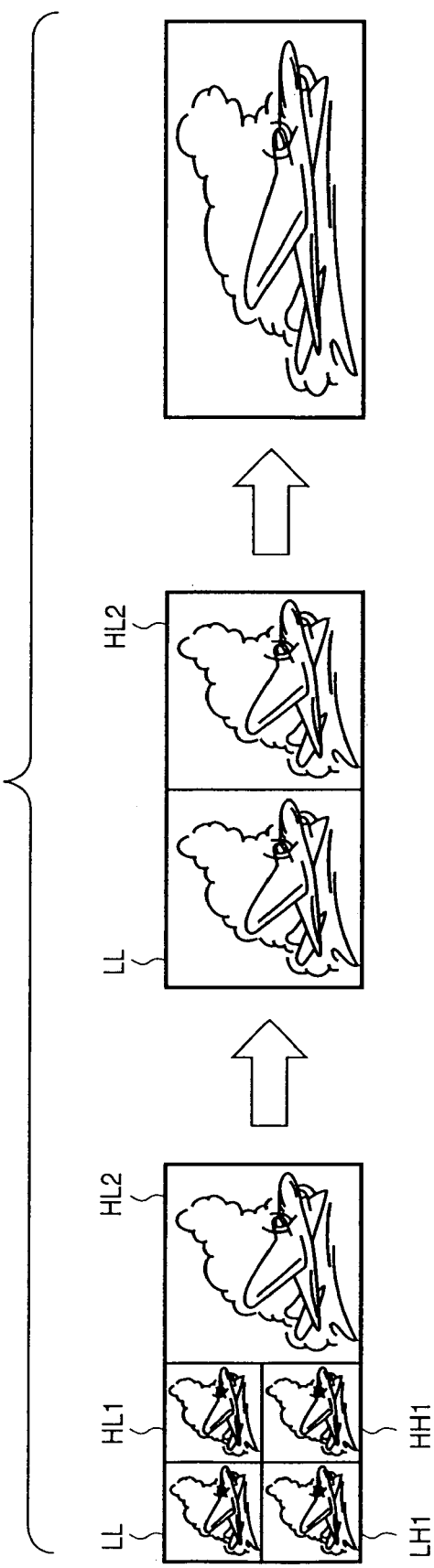
FIG. 9 is a view for explaining an inverse transform process in a case wherein a control signal through a signal line 908 is "0" and an interlaced image is to be output.

If the control signal input through the signal line 908 is "0", the subband LL is reconstructed in the same manner as described above from the subbands LL, LH1, HL1, and HH1, and an image with a line count ½ that of the original frame data in the vertical direction is reconstructed from the subbands LL and HL2. FIG. 9 is a view for explaining an inverse transform process in outputting an interlaced image when the control signal through the signal line 908 is "0".

The line de-interleaving unit 909 decomposes the line-interleaved data reconstructed by the inverse discrete wavelet transform unit 905 into two components on a line basis in accordance with a control signal through the signal line 908, and outputs the resultant data to the switch 904 or frame buffer 906. If the control signal through the signal line 908 is "w" (an interlaced image is required), the line de-interleaving unit 909 outputs the data of an odd line to the switch 904. The data of an even line is stored in the frame buffer 906.

If the control signal through the signal line 908 is "1" (a progressive image is required), the line de-interleaving unit 909 alternately repeats operation of outputting data to the switch 904 and operation of storing data in the frame buffer 906 on a line basis. This processing is equivalent to processing inverse to interleaving of odd and even frames by the line interleaving unit 103 in the moving image coding apparatus according to the first embodiment. The sequence of outputting data to the switch 904 and storing data in the frame buffer 906 is changed for every two lines. For example, after the data of a line m is output to the switch 904 and the data of a line m+1 is stored in the frame buffer 906, the operation sequence is changed to store the data of a line m+2 in the frame buffer 906 and output the data of line m+3 to the switch 904. With this operation, the data of each odd frame is output to the switch 904, and the data of each even frame is stored in the frame buffer 906.

The switch 904 switches connection in accordance with the frame number of a frame to be output. When an odd frame is to be output, the switch 904 connects to the line de-interleaving unit 909. When an even frame is to be output, the switch 904 connects to the frame buffer 906.

The moving image data output unit 907 outputs reconstructed image data, output from the inverse discrete wavelet transform unit 905 or 906, to the outside of the apparatus. The moving image data output unit 907 can be realized by a storage unit such as a hard disk or memory, an interface to a network line or display device, and the like.

When a control signal through the signal line 908 is "0", i.e., outputting of an interlaced image is selected, data reconstructed from one frame of coded data to be decoded is equivalent to one field in an interlaced image. In this case, therefore, odd and even fields in the first frame of moving image data output from this moving image decoding apparatus can be obtained from the coded data of frames 1 and 2 of the coded data shown in FIG. 7.

That is, the present invention is associated with a moving image decoding technique of decoding interlaced image data from the coded data of image data in which the line data of two consecutive frames are arranged in a predetermined order, and has the following characteristic feature. Predetermined subbands are decoded from coded data. The decoded subbands are then combined to reconstruct image data. The reconstructed image data is decomposed into odd and even fields.

As described above, the respective line data of two consecutive frames are arranged in a predetermined order in a coding process to generate new image data. This data is then decomposed into subbands and coded. This makes it possible to play back an interlaced image with 30 frames per sec by decoding part of the coded data on the decoding side instead of decoding all the coded data. In addition, a progressive image with 60 frames per sec can be played back by decoding the coded data of all the subbands.

Third Embodiment

In the first embodiment, the line interleaving unit 103 alternately arranges even and odd frames while changing the order to combine the frames. However, the same effects as in the first embodiment can be obtained by using another interleaving method. This embodiment will exemplify the case wherein the line interleaving method using the line interleaving unit 103 is changed. Note that the image coding apparatus according to this embodiment has the same arrangement as that of the image coding apparatus according to the first embodiment, and differs therefrom in only the operation of a line interleaving unit 103.

The line interleaving unit 103 generates an image with a line count being doubled in the horizontal direction from the data of an odd frame stored in a frame buffer 109 and the data of an even frame input through a switch 102, and outputs the resultant data to a discrete wavelet transform unit 104. The odd lines of interleaved image data are generated by alternately arranging the odd line data of an input odd frame and the even line data of an even frame on a pixel basis. Likewise, the even lines of the image data are generated by alternately arranging the even line data of the input odd frame and the odd line data of the even frame on a pixel basis. That is, the present invention is characterized in that an odd line of an odd frame and an even line of an even frame are arranged on the same line, and an even line of the odd frame and an odd line of the even frame are arranged on the same line.

Figure 10:
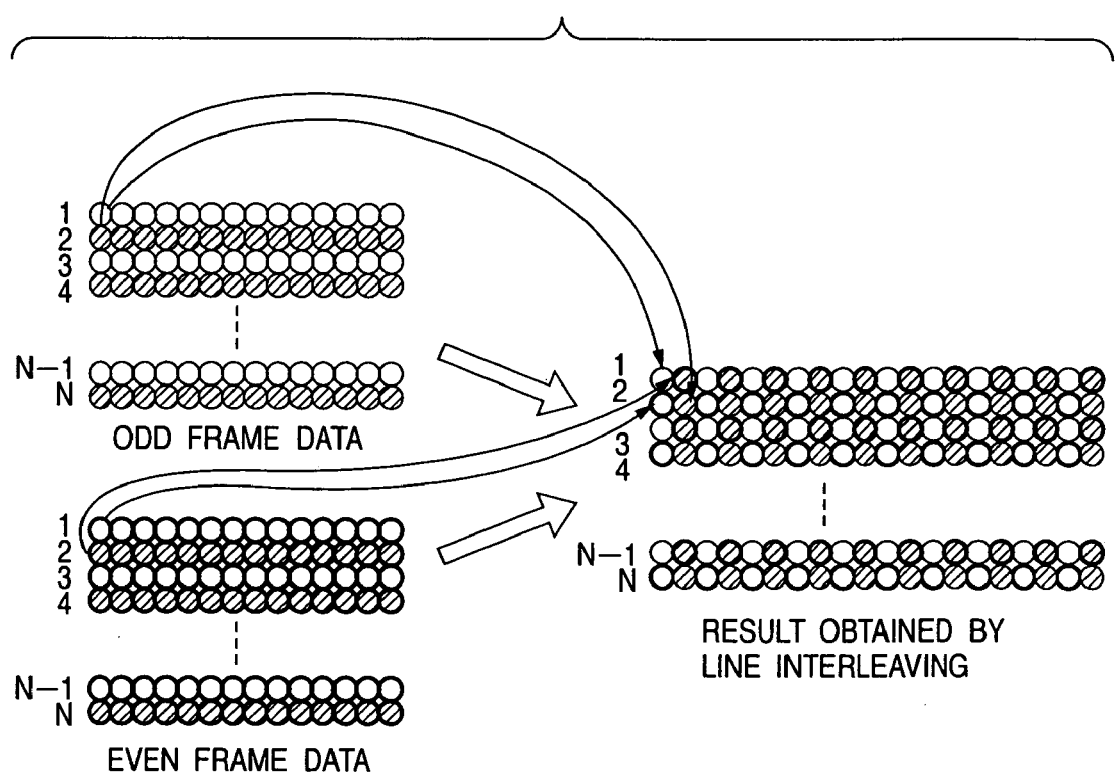
FIG. 10 is a view for explaining the result obtained by line interleaving of odd frame data and even frame data in the third embodiment.
Figure 11:
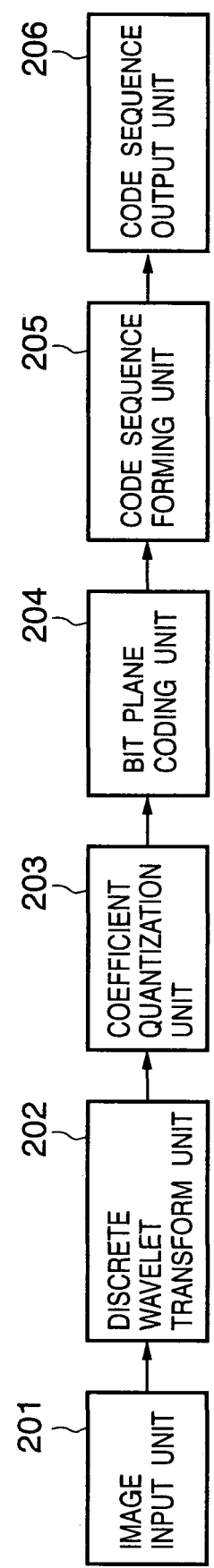
FIG. 11 is a block diagram showing the arrangement of a conventional image coding apparatus using a coding scheme based on a combination of wavelet transform and bit plane coding.

FIG. 10 is a view for explaining the result obtained by line interleaving of odd frame data and even frame data in the third embodiment. Referring to FIG. 10, each circle indicates one pixel of an odd or even frame, each circle without any pattern indicates a pixel on an odd line, and each circle with a hatched pattern indicates a pixel on an even line. The data of the even frame are indicated by thick lines. The numerical values at the left ends of the lines represent the line numbers of the even and odd frames and interleaved image data. Note that the line number "1" indicates the first line of a frame, and the line number "N" indicates the last line. In addition, let x be the position of image data in the horizontal direction which is generated by the line interleaving unit 103, y be the position of the data in the vertical direction, and P' (x, y) be a pixel value at coordinates (x, y). Subsequently, interleaved image data P' (x, y) is coded in the same manner as in the first embodiment.

The moving image decoding apparatus for decoding coded data generated in this embodiment will be described below. The moving image decoding apparatus according to this embodiment has the same arrangement as that shown in the block diagram of FIG. 8 which shows the moving image decoding apparatus according to the second embodiment, and differs therefrom in only the operation of a line de-interleaving unit 909.

The line de-interleaving unit 909 decomposes line-interleaved data reconstructed by an inverse discrete wavelet transform unit 905 into two components in accordance with a control signal through a signal line 908, and outputs the resultant data to a switch 904 or frame buffer 906. If the control signal through the signal line 908 is "0" (an interlaced image is required), the line de-interleaving unit 909 outputs odd-numbered data (the leftmost data is regarded as the first data) on each line to the switch 904, and stores even-numbered data in the frame buffer 906.

If the control signal through the signal line 908 is "1" (a progressive image is required), the data of odd and even frames are generated as reverse to the line interleaving processing in FIG. 10, and the odd frame data is output to the switch 904, and the even frame data is stored in the frame buffer 906.

As described above, an interlaced image with 30 frames per sec can be played back by extracting and decoding the coded data of some subbands from the coded data obtained by interleaving and coding odd and even frames. In addition, a progressive image with 60 frames per sec can be played back by decoding the coded data of all the subbands.

Fourth Embodiment

The present invention is not limited to the above embodiments. In the first to third embodiments, for example, bit plane coding is performed on a subband basis. However, each subband may be divided into blocks, and bit plane coding may be performed on a block basis. Alternatively, one bit plane may be coded in a plurality of passes.

In addition, the method using an MQ-coder has been described as a binary arithmetic coding method. However, an arithmetic coding method using a QM-Coder or the like other than an MQ-coder may be used, or another kind of binary coding scheme may be used as long as it is suitable for coding a multi-context information source.

If there is no need to change the decoded pixel precision stepwise, the coefficients of subbands may be subjected to entropy coding as multilevel data instead of bit plane coding. In addition, a filter for subband decomposition is not limited to the one in the above embodiments, and another kind of filter may be used. Furthermore, the number of times the filter is applied is not limited to that in the above embodiments. In the above embodiments, one-dimensional discrete wavelet transform is applied in the horizontal and vertical directions the same number of times. However, the number of times this processing is applied may differ.

The method of interleaving odd frame data and even frame data is not limited to the method described in the above embodiments as long as interlaced image data can be played back from part of a plurality of subbands generated by subband decomposition. For example, in the above embodiments, an odd line of an odd frame and an even line of an even frame are set on an odd line of an interleaved image, and data necessary for interlaced image playback and unnecessary data are separated from each other by subband decomposition performed first in the vertical direction. However, such data may be separated from each other by subband decomposition in the horizontal direction by arranging these lines as odd lines.

The structure of a code sequence is not limited to that in the above embodiments. For example, the order of code sequences and the storage form of additional information may be changed like a code sequence based on JPEG 2000 defined in ISO/IEC 15444-1 or a code sequence based on Motion JPEG 2000 defined in ISO/IEC 15444-3.

Fifth Embodiment

[Moving Image Coding Apparatus]

Figure 12:
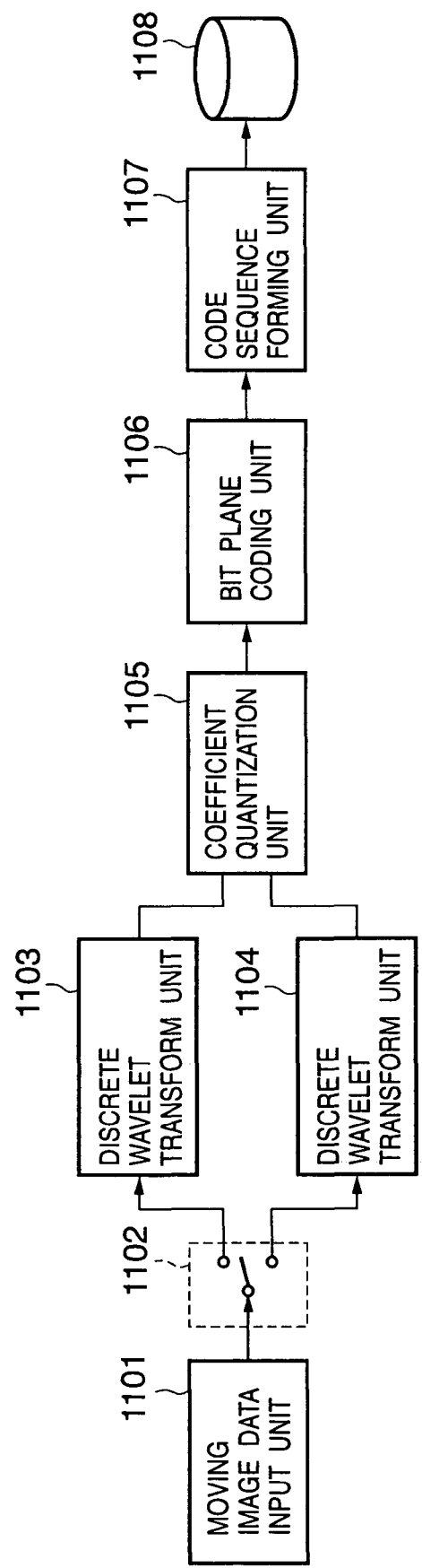
FIG. 12 is a block diagram showing the arrangement of a moving image coding apparatus according to the fifth embodiment of the present invention.

FIG. 12 is a block diagram showing the arrangement of a moving image coding apparatus according to the fifth embodiment of the present invention. As shown in FIG. 12, the moving image coding apparatus includes a moving image data input unit 1101, switch 1102, discrete wavelet transform units 1103 and 1104, coefficient quantization unit 1105, bit plane coding unit 1106, code sequence forming unit 107, and secondary storage unit 1108.

The operation of each constituent element of the moving image coding apparatus according to the fifth embodiment shown in FIG. 12 will be described in detail below. Assume that in this embodiment, monochrome moving image data which is constituted by 60 frames per sec, has an 8-bit luminance value per pixel, and corresponds to four sec (a total of 240 frames) is input to the moving image coding apparatus to be coded. That is, the moving image coding apparatus according to this embodiment codes moving image data constituted by 60 frames per sec and input from the moving image data input unit 1101 on a frame basis, and finally stores the coded data sequence in the secondary storage unit 1108.

First of all, moving image data which is constituted by 60 frames per sec and corresponds to four sec is input from the moving image data input unit 1101. The moving image data input unit 1101 is, for example, the image sensing portion of a digital camera or the like and can be realized by an image sensing device such as a CCD and various kinds of image adjustment circuits for gamma correction, shading correction, and the like. The moving image data input unit 1101 sends the input moving image data frame by frame to the switch 1102. For the sake of convenience, in the following description, the respective frame data are sequentially assigned numbers starting from 1 to be identified as, for example, frame 1, frame 2, . . . . In addition, the position (coordinate) of each frame in the horizontal direction is represented by x; the position of each frame in the vertical direction, y, and the pixel value at a position (x, y), P(x, y).

The switch 1102 sends the frame data input from the moving image data input unit 1101 either to the discrete wavelet transform unit 1103 or to the discrete wavelet transform unit 1104 by switching connection in accordance with the frame number. In this embodiment, the switch 1102 is connected to the discrete wavelet transform unit 1103 when the input frame is an odd frame, and is connected to the discrete wavelet transform unit 1104 when the input frame is an even frame.

The odd frame data input to the discrete wavelet transform unit 1103 and the even frame data input to the discrete wavelet transform unit 1104 are properly stored in internal buffers (not shown), respectively, and subjected to two-dimensional discrete wavelet transform. Two-dimensional discrete wavelet transform is implemented by applying one-dimensional discrete wavelet transform in the horizontal and vertical directions. Note that the subbands of an image to be coded which are processed by two-dimensional discrete wavelet transform have already been described with reference to FIGS. 3A, 3B, and 3C in the first embodiment, and hence a description thereof will be omitted.

The discrete wavelet transform units 1103 and 104 in this embodiment repeatedly apply two-dimensional discrete wavelet transform to the subband LL obtained by the above two-dimensional discrete wavelet transform. This makes it possible to decompose the target image into seven subbands LL, LH1, HL1, HH1, LH2, HL2, and HH2. FIG. 4 shows the seven subbands obtained by performing two-dimensional discrete wavelet transform twice.

In this embodiment, a coefficient in each subband is represented by C(S, x, y) where S represents the type of subband, and (x, y) represents a coefficient position (coordinates) in the horizontal and vertical directions when the coefficient position at the upper left corner in each subband is represented by (0, 0).

Note that the discrete wavelet transform units 1103 and 1104 differ only in their methods of one-dimensional discrete wavelet transform applied first to frame data in the vertical direction, and use the same method of performing subsequent transform in the horizontal direction and further decomposing the subband LL.

In this embodiment, except for the first one-dimensional discrete wavelet transform applied in the vertical direction by the discrete wavelet transform unit 1104, the discrete wavelet transform units 1103 and 1104 perform one-dimensional wavelet transform for N one-dimensional signals x(n) (where n is an integer from 0 to N−1) using equations (5) and (6):

$$h(n)=x(2n+1)-\mathrm{floor}\{(x(2n)+x(2n+2))/2\} \tag{5}$$

$$l(n)=x(2n)+\mathrm{floor}\{(h(n-1)+h(n)+2)/4\} \tag{6}$$

where h(n) is a coefficient of a high-frequency subband, l(n) is a coefficient of a low-frequency subband, and floor{R} is the maximum integral value that does not exceed a real number R. Note that values x(n) at the two ends (n<0 and n>N−1) of a one-dimensional signal x(n) which are required for the calculation of equations (5) and (6) are obtained in advance from the value of the one-dimensional signal x(n) (n=0 to N−1) by a known method.

In the first one-dimensional discrete wavelet transform applied in the vertical direction by the discrete wavelet transform unit 1104, a coefficient l(n) of a low-frequency subband and a coefficient h(n) of a high-frequency subband are obtained by equations (7) and (8) for N one-dimensional signals x(n) (n=0 to N−1):

$$h(n)=x(2n)-\mathrm{floor}\{(x(2n-1)+x(2n+1))/2)\} \tag{7}$$

$$l(n)=x(2n+1)+\mathrm{floor}\{(h(n)+h(n+1))+2)/4\} \tag{8}$$

Note that values at the two ends (n<0 and n>N−1) of a one-dimensional signal x(n) are obtained in advance from the value of the one-dimensional signal x(n) (n=0 to N−1) by using a known method as in the above case.

Figure 13A:
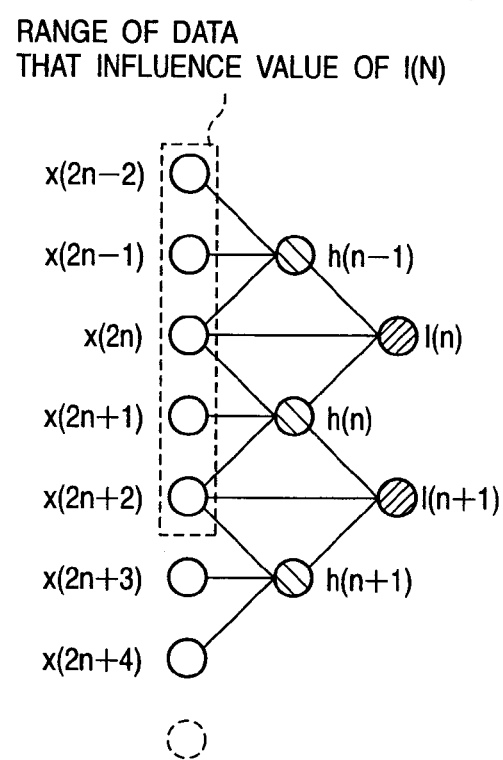
FIGS. 13A and 13B are views for explaining the difference between a decomposition procedure in a discrete wavelet transform unit 1103 and that in a discrete wavelet transform unit 1104.
Figure 13B:
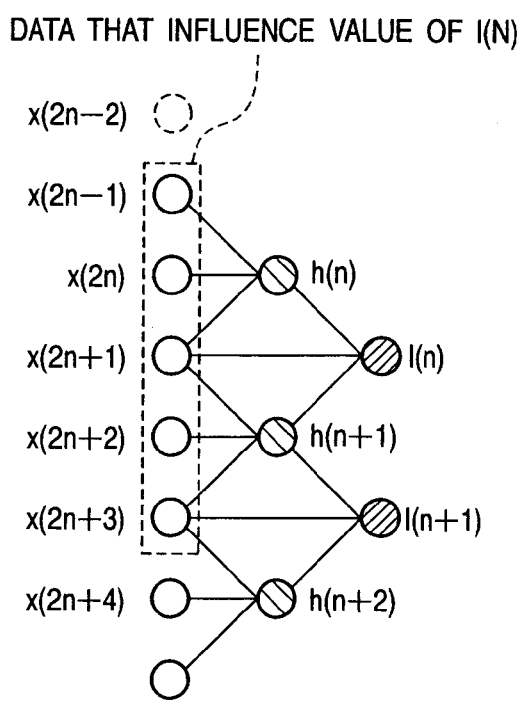

FIGS. 13A and 13B are views for explaining the difference between a decomposition procedure in the discrete wavelet transform unit 1103 and that in the discrete wavelet transform unit 1104. FIG. 13A shows a scheme used by the discrete wavelet transform unit 1103. FIG. 13B shows a scheme used by the discrete wavelet transform unit 1104. Referring to FIGS. 13A and 13B, each circle without any pattern indicates pixel data from one column (in the vertical direction) of frame data to be coded; each circle with a hatched pattern, a coefficient of a high-frequency subband; and each circle with a dot pattern, a coefficient of a low-frequency subband. The lines connecting the respective circles represent the relationship between data which are referred to obtain the coefficients of low-frequency and high-frequency subbands.

As shown in FIG. 13A, the discrete wavelet transform unit 1103 obtains the coefficient l(n) of a low-frequency subband from five consecutive signals centered on x(2n) in the vertical direction. In contrast to this, the discrete wavelet transform unit 1104 generates the coefficient l(n) of a low-frequency subband from five signals centered on x(2n+1). That is, the ranges of signals to be used by the two units shift from each other by one signal (one line) in the vertical direction.

The coefficient quantization unit 1105 quantizes the coefficient C(S, x, y) of each subband generated by the discrete wavelet transform units 1103 and 1104 with a quantization step delta(S) determined for each subband. In this case, if each quantized coefficient value is represented by Q(S, x, y), the quantization processing performed by the coefficient quantization unit 1105 is the same as that described with reference to equation (3) in the first embodiment, and hence a description thereof will be omitted. Since the operations of the bit plane coding unit 1106, code sequence forming unit 1107, and secondary storage unit 1108 are also the same as those of the bit plane coding unit 106, code sequence forming unit 107, and secondary storage unit 108 in the first embodiment, a description thereof will be omitted.

Figure 14:
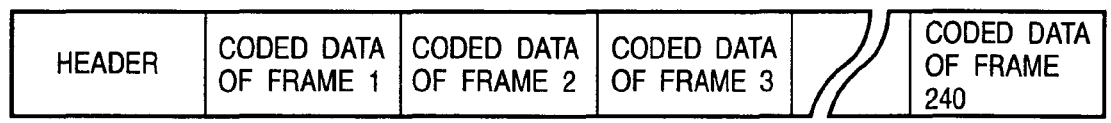
FIG. 14 is a view showing an example of the code sequence of each frame stored in a secondary storage unit 1108.

FIG. 14 is a view showing an example of the code sequence of each frame stored in the secondary storage unit 1108. In the moving image coding apparatus according to this embodiment, the respective units perform the above operations to obtain coded data like the one shown in FIG. 7. In storing code sequences in the secondary storage unit 1108, they may be arranged in frame order to be stored as one file as shown in FIG. 7, or the coded data of the respective frames may be stored as different files.

That is, the present invention is associated with a moving image coding technique of coding noninterlaced moving image data and has the following characteristic feature. A predetermined frame of noninterlaced moving image data is frequency-transformed to be decomposed into a plurality of subbands. The frame next to the predetermined frame is then shifted by one line in the vertical direction and frequency-transformed to be decomposed into a plurality of subbands. Each frame decomposed into a plurality of subbands is coded.

In addition, the present invention is characterized in that the first and second subband decomposition processes use two-dimensional discrete wavelet transform to decompose each frame into a plurality of subbands.

[Image Decoding Apparatus]

Figure 15:
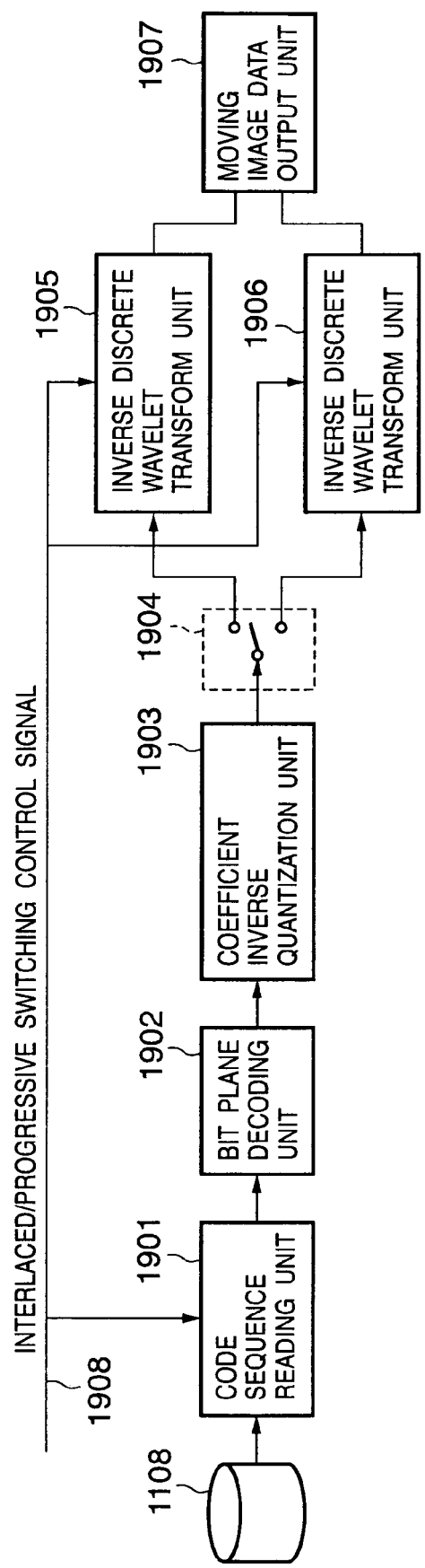
FIG. 15 is a block diagram showing the arrangement of a moving image decoding apparatus for decoding the coded data generated by the moving image coding apparatus according to the fifth embodiment of the present invention.

FIG. 15 is a block diagram showing the arrangement of a moving image decoding apparatus for decoding coded data generated by the moving image coding apparatus according to the fifth embodiment of the present invention. The same reference numerals as in FIG. 12 denote the same parts (secondary storage unit 1108) in FIG. 15, and a description thereof will be omitted. As shown in FIG. 15, the moving image decoding apparatus according to this embodiment includes a code sequence reading unit 1901, bit plane decoding unit 1902, coefficient inverse quantization unit 1903, switch 1904, inverse discrete wavelet transform units 1905 and 1906, moving image data output unit 1907, signal line 1908, and secondary storage unit 1108.

An operation procedure for the moving image decoding apparatus according to this embodiment which decodes coded data generated by the moving image coding apparatus will be described below with reference to FIG. 15.

The moving image decoding apparatus according to this embodiment can select and play back an interlaced image or progressive image (noninterlaced image) in accordance with an interlaced/progressive (noninterlaced) switching control signal input from the outside of the apparatus through the signal line 1908. In this embodiment, every signal value input through the signal line 1908 is either "0" or "1". For example, when "0" is input, an interlaced image is output, whereas when "1" is input, a progressive image is output.

Moving image data is decoded frame by frame in coded data. The code sequence reading unit 1901 reads out the coded data of a target frame from the coded data stored in the secondary storage unit 1108 and stores the read data in an internal buffer (not shown). At this time, if the interlaced/progressive switching control signal received through the signal line 1908 is "0", i.e., outputting of an interlaced image is selected, reading of the coded data of subbands LH2 and HH2 of the coded data of the frame is inhibited.

The bit plane decoding unit 1902 reads out coded data from the internal buffer in the code sequence reading unit 1901 in subband order, and decodes the data into quantized transform coefficient data Q(S, x, y). The processing in the bit plane decoding unit 1902 pairs up with the bit plane coding unit 1106 shown in FIG. 12.

That is, the bit plane coding unit 1106 performs binary arithmetic coding of the respective bits of the absolute value of a coefficient from the most significant bit plane to the least significant bit plane with a predetermined context. Likewise, the bit plane decoding unit 1902 decodes the binary arithmetic coded data from the most significant bit plane to the least significant bit plane with the same context as in coding, thereby reconstructing the respective bits of the coefficient. In addition, the arithmetic code of the sign of the coefficient is decoded by using the same context at the same timing as in coding.

The coefficient inverse quantization unit 1903 reconstructs a coefficient C(S, x, y) of each subband from a quantization step delta(S) determined for each subband and the coefficient value Q(S, x, y) decoded and quantized by the bit plane decoding unit 1902.

The switch 1904 switches connection in accordance with the frame number of a frame to be decoded and allows to select whether to perform inverse discrete wavelet transform using the inverse discrete wavelet transform unit 1905 or inverse discrete wavelet transform unit 1906. In this embodiment, the switch 1904 connects to the inverse discrete wavelet transform unit 1905 when an odd frame is to be decoded, and connects to the inverse discrete wavelet transform unit 1906 when an even frame is to be decoded.

The inverse discrete wavelet transform unit 1905 and inverse discrete wavelet transform unit 1906 reconstruct the data of frames by performing transform inverse to wavelet transform processing in the discrete wavelet transform unit 1103 and discrete wavelet transform unit 1104 in FIG. 12. In this case, if the control signal input through the signal line 1908 is "1", the subband LL shown in FIG. 3C is reconstructed from the coefficients of subbands LL, HL1, LH1, and HH1, and the data is reconstructed with the same size as that of the original frame data as shown in FIG. 3A from the subband LL and subbands LH2, HL2, and HH2 through the step shown in FIG. 3B.

If the control signal input through the signal line 1908 is "0", the subband LL is reconstructed in the same manner as described above from the subbands LL, LH1, HL1, and HH1, and an image with a line count ½ that of the original frame data in the vertical direction is reconstructed from the subbands LL and HL2. Note that an inverse transform process in outputting an interlaced image when the control signal through the signal line 1908 is "0" is the same as that described with reference to FIG. 9 in the second embodiment.

The moving image data output unit 1907 outputs the decoded image data, output from the inverse discrete wavelet transform units 1905 and 1906, to the outside of the apparatus. The moving image data output unit 1907 can be realized by, for example, a storage unit such as a hard disk or memory, an interface to a network line or display device, and the like.

When a control signal through the signal line 1908 is "0", i.e., outputting of an interlaced image is selected, data reconstructed from one frame of coded data to be decoded is equivalent to one field in an interlaced image. In this case, therefore, an odd field of the first frame of moving image data to be output from this moving image decoding apparatus is obtained from the coded data of frame 1 of the coded data shown in FIG. 14, and an even field of the first frame is obtained from the coded data of frame 2.

That is, the present invention is associated with a moving image decoding technique of decoding interlaced image data from coded moving image data, and has the following characteristic feature. Predetermined subbands are decoded from coded moving image data, and predetermined subbands decoded from the coded data of a predetermined frame are combined to reconstruct odd fields associated with the predetermined frame. In addition, predetermined subbands decoded from the coded data of the frame next to the predetermined frame are combined to reconstruct even fields associated with the predetermined frame.

The present invention has therefore the following characteristic feature. It is designated whether the coded data is decoded into interlaced image data or noninterlaced image data. When interlaced decoding is designated, coded moving image data containing no coded data of predetermined high-frequency components is decoded. When noninterlaced decoding is designated, subbands decoded from all the coded moving image data are combined to reconstruct a predetermined frame, and subbands decoded from the coded data of the frame next to the predetermined frame are combined to reconstruct the next frame.

The present invention is not limited to this, and may be applied to a case wherein a luminance value is expressed by the number of bits, e.g., 4, 10, or 12, other than 8, or color image data is used, whose pixel is expressed by a plurality of color components such as R, G, and B components, Y, Cr, and Cb components, or C, M, Y, and K components. The present invention can also be applied to a case wherein when multilevel information representing the state of each pixel in an image area is to be coded or decoded, for example, the color of each pixel is represented by an index value for a color table, and the index value is coded or decoded. Furthermore, the capture time and the number of frames captured per sec are not limited to those in the embodiment described above.

As described above, in discrete wavelet transform applied first in the vertical direction in a coding process, a low-pass filter and high-pass filter are shifted by one line in processing an odd frame and even frame. This makes it possible to play back an interlaced image with 30 frames per sec on the decoding side by decoding part of coded data without decoding all the coded data. In addition, a progressive image with 60 frames per sec can be played back by decoding the coded data of all the subbands.

Sixth Embodiment

[Moving Image Coding Apparatus]

Figure 16:
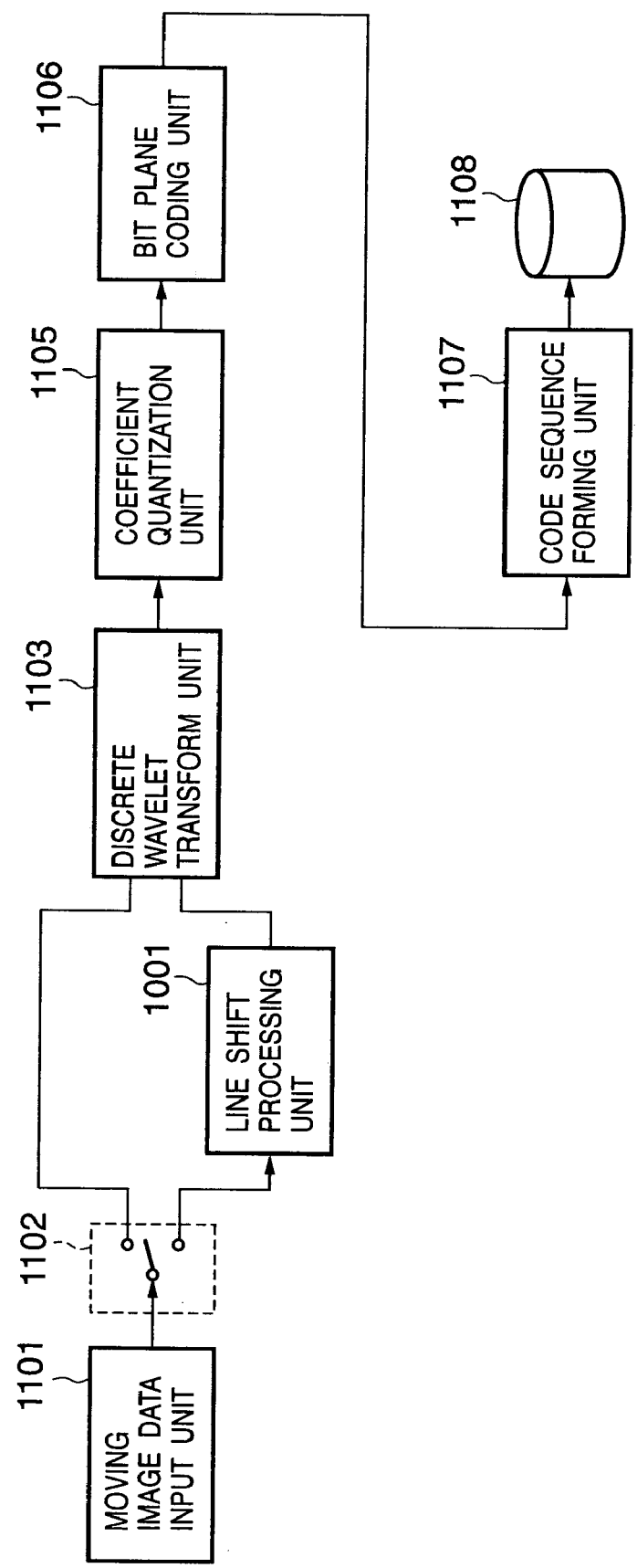
FIG. 16 is a block diagram showing the detailed arrangement of a moving image coding apparatus according to the sixth embodiment of the present invention.

FIG. 16 is a block diagram showing the detailed arrangement of a moving image coding apparatus according to the sixth embodiment of the present invention. The same reference numerals as in the block diagram of FIG. 12 in the fifth embodiment denote the same parts in FIG. 16, and a description thereof will be omitted.

As shown in FIG. 16, the moving image coding apparatus includes a moving image data input unit 1101, switch 1102, line shift processing unit 1001, discrete wavelet transform unit 1103, coefficient quantization unit 1105, bit plane coding unit 1106, code sequence forming unit 1107, and secondary storage unit 1108.

The fifth embodiment is configured to switch discrete wavelet transform operations such that a filter applied first to an odd frame in the vertical direction is shifted from that applied to an even frame by one line. In this embodiment, the same effect is obtained by causing the line shift processing unit 1001 to shift an even frame of frames by one line.

Assume that in this embodiment, as in the fifth embodiment, monochrome moving image data which is constituted by 60 frames per sec, has a luminance value of eight bits per pixel, and corresponds to four sec (a total of 240 frames) is coded. The operation procedure of the moving image coding apparatus according to this embodiment will be described with reference to FIG. 16. Note that a description of the same operations as those in the fifth embodiment will be omitted.

First of all, the above moving image data which is constituted by 60 frames per sec and corresponds to four sec is input from the moving image data input unit 1101. The moving image data input unit 1101 is, for example, the image sensing portion of a digital camera or the like and can be realized by an image sensing device such as a CCD and various kinds of image adjustment circuits for gamma correction, shading correction, and the like. The moving image data input unit 1101 sends the input moving image data frame by frame to the switch 1102. As in the fifth embodiment, the respective frame data are assigned numbers, in order of time, starting from 1 to be identified as, for example, frame 1, frame 2, . . . In addition, the position (coordinate) of each frame in the horizontal direction is represented by x; the position of each frame in the vertical direction, y, and the pixel value at a position (x, y), P(x, y).

The switch 1102 sends the frame data input from the moving image data input unit 1101 either to the discrete wavelet transform unit 1103 or to the line shift processing unit 1001 by switching connection in accordance with the frame number. In this embodiment, the switch 1102 switches connection to the discrete wavelet transform unit 1103 when the input frame is an odd frame, and to the line shift processing unit 1001 when the input frame is an even frame.

Figure 17:
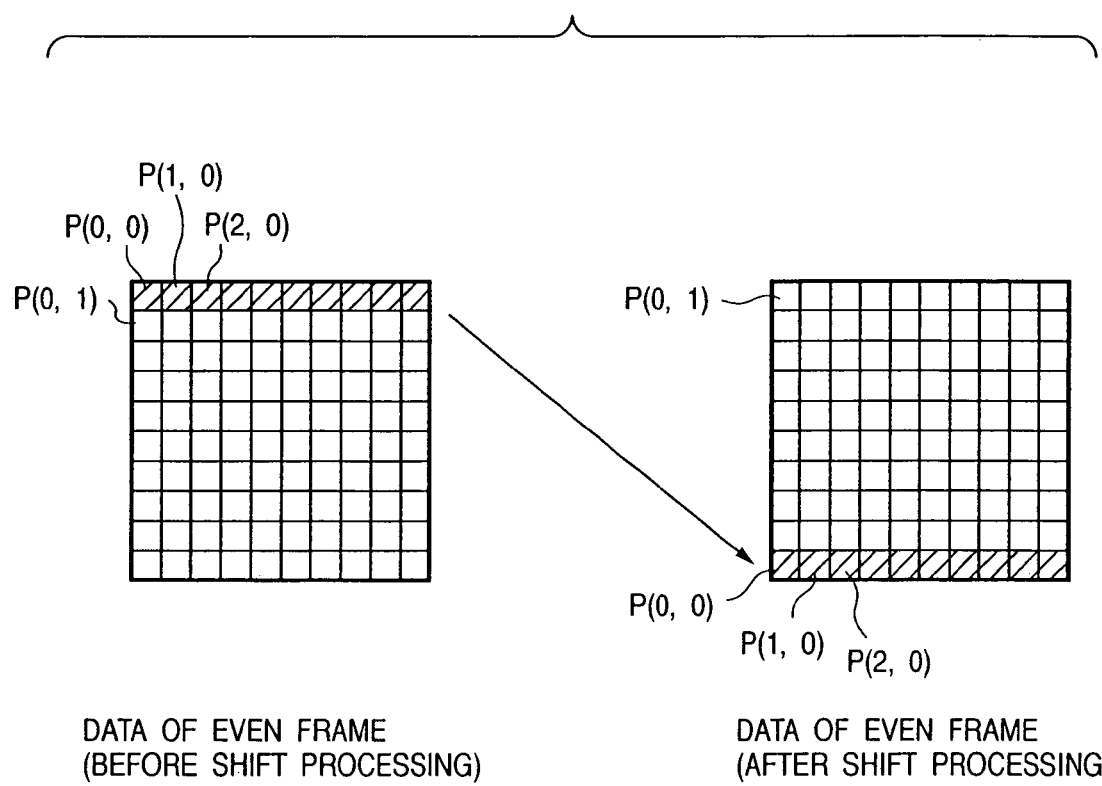
FIG. 17 is a view for explaining one-line shift processing performed by a line shift processing unit 1001 with respect to data P(x, y) of an even frame input from a moving image data input unit 1101.

FIG. 17 is a view for explaining how the line shift processing unit 1001 performs one-line shift processing for the data P(x, y) of the even frame input from the moving image data input unit 1101. As shown in FIG. 17, the line shift processing unit 1001 in this embodiment moves the data of the first line of an even frame to the last line of the frame.

Subsequently, the discrete wavelet transform unit 1103, coefficient quantization unit 1105, bit plane coding unit 1106, and code sequence forming unit 1107 perform the same coding processing as that in the fifth embodiment described above with respect to the even frame data after shift processing by the line shift processing unit 1001 and the odd frame data input through the switch 1102. As a consequence, the coded data of the input moving image data is stored in the secondary storage unit 1108.

That is, the present invention is associated with a moving image coding technique of coding noninterlaced moving image data, and has the following characteristic feature. The frame next to a processed frame of noninterlaced moving image data is shifted by one line in the vertical direction to generate a frame. A predetermined frame and the frame shifted by one line are frequency-transformed to be decomposed into a plurality of subbands. The frame decomposed into a plurality of subbands is then coded.

In addition, the present invention is characterized in that each frame is decomposed into a plurality of subbands by using two-dimensional discrete wavelet transform.

[Image Decoding Apparatus]

Figure 18:
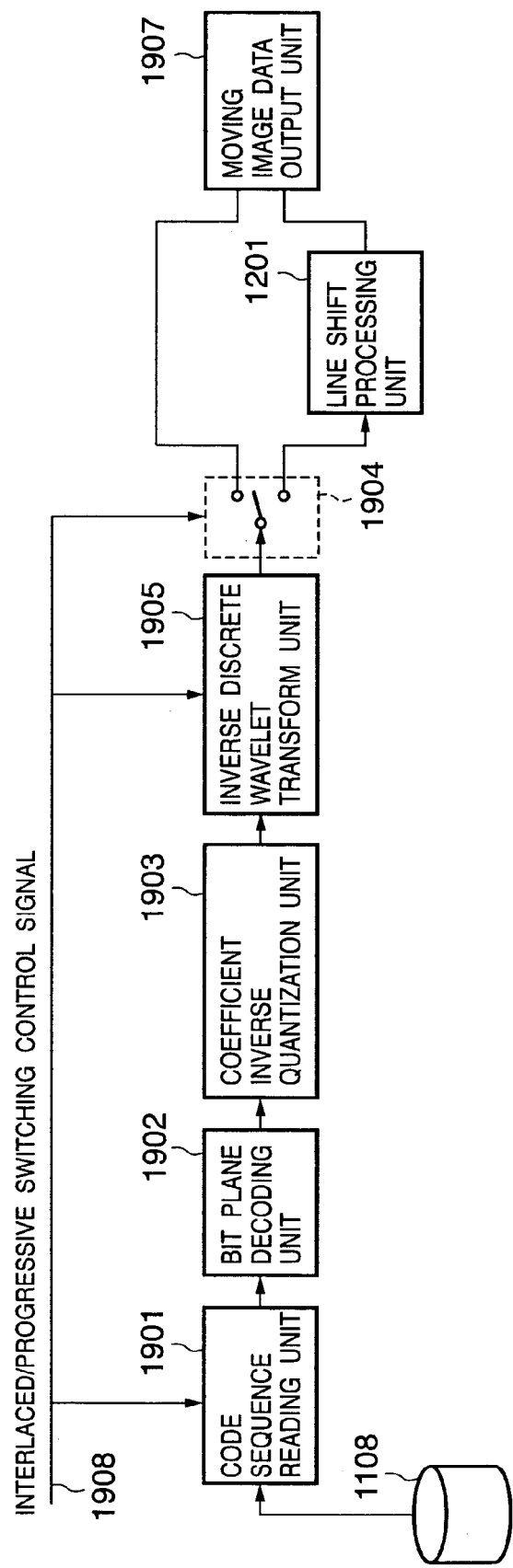
FIG. 18 is a block diagram showing the arrangement of a moving image decoding apparatus for decoding coded data generated by the moving image coding apparatus according to the sixth embodiment of the present invention.

FIG. 18 is a block diagram showing the arrangement of a moving image decoding apparatus for decoding coded data generated by the moving image coding apparatus according to the sixth embodiment of the present invention. The same reference numerals as in FIGS. 12 and 15 denote the same parts (secondary storage unit 1108) in FIG. 18, and a description thereof will be omitted. As shown in FIG. 18, the moving image decoding apparatus includes a secondary storage unit 1108, code sequence reading unit 1901, bit plane decoding unit 1902, coefficient inverse quantization unit 1903, switch 1904, inverse discrete wavelet transform unit 1905, line shift processing unit 1201, moving image data output unit 1907, and signal line 1908.

The operation of the moving image decoding apparatus according to this embodiment which decodes coded data generated by the moving image coding apparatus will be described below with reference to FIG. 18.

Like the moving image decoding apparatus according to the fifth embodiment, the moving image decoding apparatus according to this embodiment can select and play back an interlaced image or progressive image in accordance with an interlaced/progressive switching control signal input from the outside of the apparatus through the signal line 1908. In this embodiment, every signal value input through the signal line 1908 is either "0" or "1". For example, when "0" is input, an interlaced image is output, whereas when "1" is input, a progressive image is output.

As in the moving image decoding apparatus according to the fifth embodiment, in the moving image decoding apparatus shown in FIG. 18, the data of each frame of coded moving image data to be stored in the secondary storage unit 1108 is decoded by the processing performed by the code sequence reading unit 1901, bit plane decoding unit 1902, coefficient inverse quantization unit 1903, and inverse discrete wavelet transform unit 1905. Note that the decoded frame data is represented by P'(x, y).

The switch 1904 switches connection in accordance with the frame number of a frame to be decoded so as to send the frame data decoded by the above decoding processing either to the moving image data output unit 1907 directly or to the line shift processing unit 1201. In this case, if a control signal input through the signal line 1908 is "0", the switch 1904 connects to the moving image data output unit 1907 to send the decoded frame data thereto. If the control signal is "1" and the decoded frame is an even frame, the switch 1904 connects to the line shift processing unit 1201.

Figure 19:
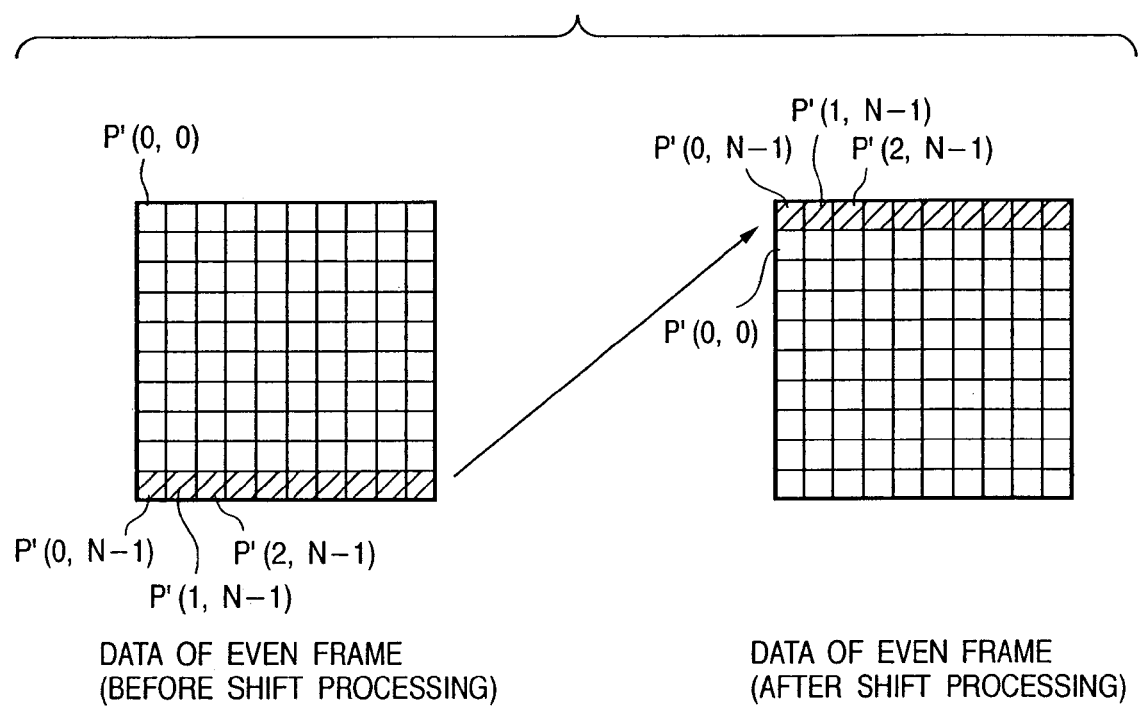
FIG. 19 is a view for explaining one-line shift processing performed by a line shift processing unit 1201 with respect to data P(x, y) of an even frame input from a code sequence reading unit 1901.

FIG. 19 is a view for explaining how the line shift processing unit 1201 performs one-line shift processing for the data P(x, y) of an even frame input from the code sequence reading unit 1901. The line shift processing unit 1201 shifts the frame data input through the switch 1904 downward by one line, as shown in FIG. 19. At this time, the data of the last one line of the frame is moved to the first line of the frame after shift processing. This operation is performed to restore the data processed by the line shift processing unit 1001 on the coding side to the initial state. Referring to FIG. 19, reference symbol denotes the number of lines of the frame data.

The moving image data output unit 1907 outputs, to the outside of the apparatus, the decoded image data input through the switch 1904 and the decoded image data input from the line shift processing unit 1201. The moving image data output unit 1907 can be realized by, for example, a storage unit such as a hard disk or memory, an interface to a network line or display device, and the like.

As in the image decoding apparatus described in the fifth embodiment, when a control signal through the signal line 1908 is "0", i.e., outputting of an interlaced image is selected, data reconstructed from one frame of coded data to be decoded is equivalent to one field in an interlaced image. In this case, therefore, an odd field of the first frame of moving image data to be output from this moving image decoding apparatus is obtained from the coded data of frame 1 of the coded data shown in FIG. 14, and an even field of the first frame is obtained from the coded data of frame 2.

That is, the present invention is associated with a moving image decoding technique of decoding interlaced image data, and has the following characteristic feature. Predetermined subbands are decoded from the coded data of a predetermined frame of moving image data and the next frame. Predetermined subbands decoded from the coded data are combined to reconstruct the predetermined frame and the next frame. Line data of the frame next to the predetermined frame is shifted by one line, and an odd field is output from the predetermined frame. An even field is then output from the next frame shifted by one line.

In addition, the present invention is characterized in that it is designated whether coded data is decoded into interlaced data or noninterlaced data, and when interlaced decoding is designated, predetermined subbands are decoded from the coded data containing no predetermined high-frequency components.

Furthermore, the present invention is characterized in that it is designated whether coded data is decoded into interlaced data or noninterlaced data, and when noninterlaced decoding is designated, predetermined subbands are decoded from all the coded data, and a predetermined frame decoded from the input coded data and the next frame are output.

The present invention is not limited to this, and may be applied to a case wherein a luminance value is expressed by the number of bits, e.g., 4, 10, or 12, other than 8, or color image data is used, whose pixel is expressed by a plurality of color components such as R, G, and B components, Y, Cr, and Cb components, or C, M, Y, and K components. The present invention can also be applied to a case wherein when multilevel information representing the state of each pixel in an image area is to be coded or decoded, for example, the color of each pixel is represented by an index value for a color table, and the index value is coded or decoded. Furthermore, the capture time and the number of frames captured per sec are not limited to those in the embodiment described above.

Seventh Embodiment

In the fifth embodiment, the discrete wavelet transform units 1103 and 1104 perform discrete wavelet transform the same number of times in the horizontal and vertical directions. If, however, the number of times of discrete wavelet transform in the vertical direction is increased, the required numbers of times of inverse discrete wavelet transform in the horizontal and vertical directions in decoding interlaced image data can be made equal to each other.

Figure 20:
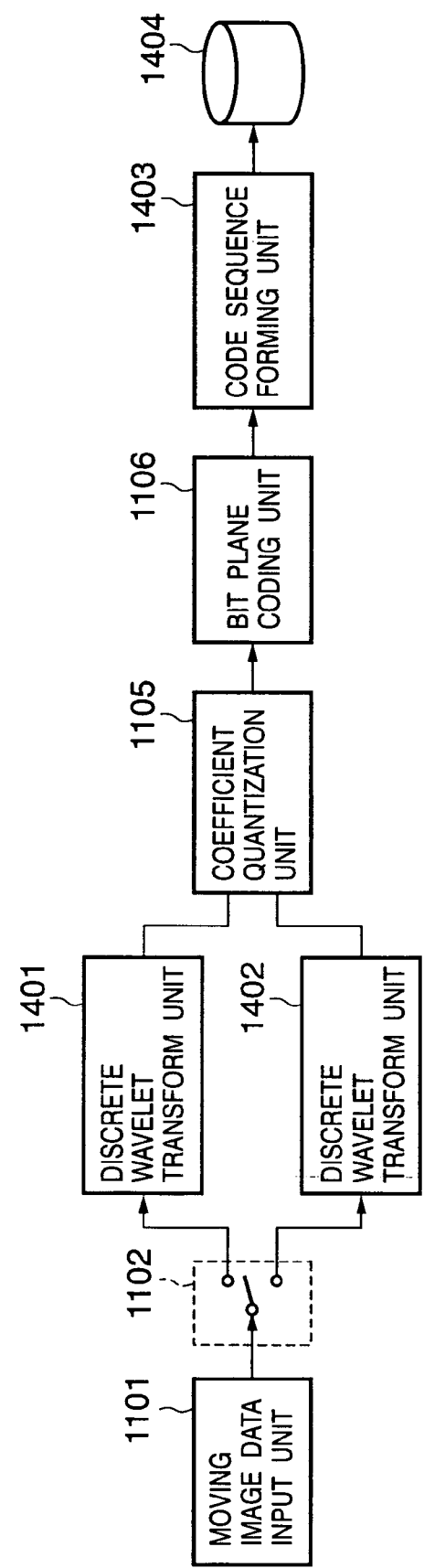
FIG. 20 is a block diagram showing the arrangement of a moving image coding apparatus according to the seventh embodiment of the present invention.

FIG. 20 is a block diagram showing the arrangement of a moving image coding apparatus according to the seventh embodiment of the present invention. The same reference numerals denote parts common to the image coding apparatus of the fifth embodiment shown in FIG. 12 and the image coding apparatus shown in FIG. 20, and a description thereof will be omitted. The image coding apparatus shown in FIG. 20 differs from the image coding apparatus of the fifth embodiment in the functions of discrete wavelet transform units 1401 and 1402 and code sequence forming unit 1403.

Assume that as in the fifth and sixth embodiments, in this embodiment, 60 frames are input per sec, and monochrome moving image data which has a luminance value of eight bits per pixel and corresponds to four sec, i.e., 240 frames, are coded. This moving image coding apparatus will be described below with particular emphasis on the operations of the discrete wavelet transform units 1401 and 1402 and code sequence forming unit 1403.

Figure 21C:
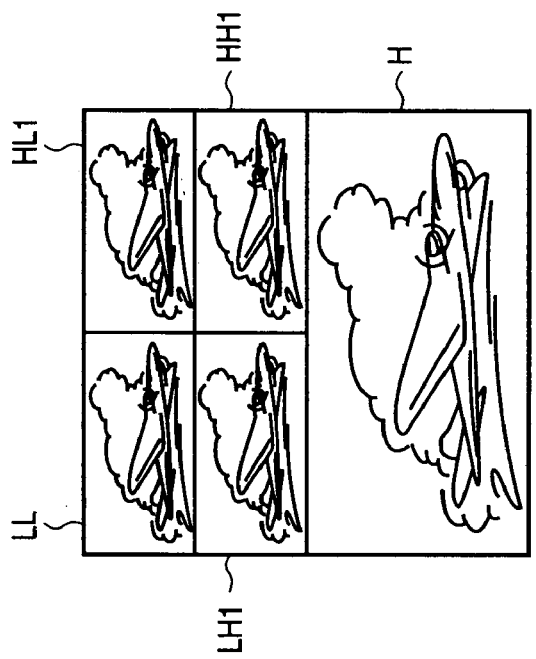
FIGS. 21A, 21B, and 21C are views for explaining subband decomposition in the moving image coding apparatus according to the seventh embodiment.
Figure 21B:
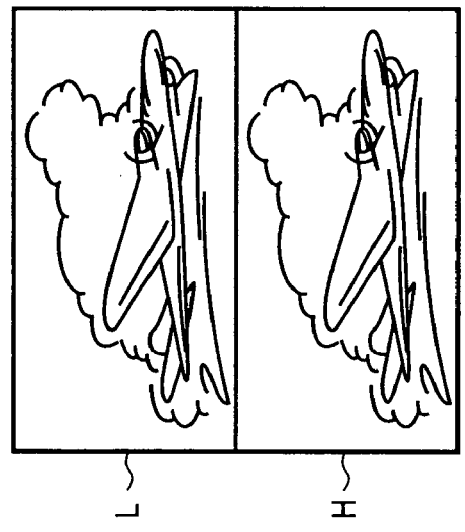
Figure 21A:
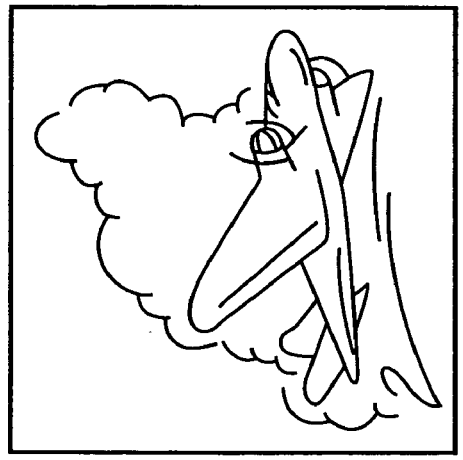

The discrete wavelet transform units 1401 and 1402 only in their one-dimensional discrete wavelet transform methods in the vertical direction which are applied first to frame data. First of all, both the discrete wavelet transform units 1401 and 1402 apply one-dimensional discrete wavelet transform to frame data in the vertical direction to decompose the data into a coefficient L of a low-frequency subband and a coefficient H of a high-frequency subband. One-dimensional discrete wavelet transform is further applied to the coefficient L of the low-frequency subband in the vertical and horizontal directions to decompose the coefficient into five subbands LL, HL1, LH1, HH1, and H. FIGS. 21A, 21B, and 21C are schematic views for explaining subband decomposition in the moving image coding apparatus according to the seventh embodiment.

The first subband decomposition in the vertical direction is performed by the discrete wavelet transform unit 1401 using the filters represented by $$l(n)=x(2n) \quad (9)$$

$$h(n)=x(2n+1)-\text{floor}\{(l(n)-l(n+1))/2\} \quad (10)$$

where h(n) is a coefficient of a high-frequency subband, l(n) is a coefficient of a low-frequency subband, and floor{R} is the maximum integral value that does not exceed a real number R. Note that values at the two ends (n<0 and n>N−1) of a one-dimensional signal x(n) which are required for the calculation of equations (9) and (10) are obtained in advance from the value of the one-dimensional signal x(n) (n=0 to N−1) by a known method.

The first subband decomposition in the vertical direction is performed by the discrete wavelet transform unit 1402 using the filters represented by $$l(n)=x(2n+1) \quad (11)$$

$$h(n)=x(2n)-\text{floor}\{(l(n-1)-l(n))/2\} \quad (12)$$

In addition, except for the first subband decomposition in the vertical direction which is performed by the discrete wavelet transform units 1401 and 1402, subband decomposition for N one-dimensional signal x(n) (n =0 to N−1) is performed by $$h(n)=x(2n+1)-\text{floor}\{(x(2n)+x(2n+2))/2\} \quad (13)$$

$$l(n)=x(2n)+\text{floor}\{(h(n-1)+h(n)+2)/4\} \quad (14)$$

where h(n) is a coefficient of a high-frequency subband, l(n) is a coefficient of a low-frequency subband, and floor{R} is the maximum integral value that does not exceed a real number R. Although not described here, values at the two ends (n<0 and n>N−1) of a one-dimensional signal x(n) which are required for the calculation of the above equations are obtained in advance from the value of the one-dimensional signal x(n) (n=0 to N−1) by a known method.

When a bit plane coding unit 1106 completely codes the coefficients of all the subbands, and all the code sequences are stored in the internal buffer, the code sequence forming unit 1403 reads out code sequences from the internal buffer in a predetermined order. The code sequence forming unit 1403 then inserts necessary additional information in the code sequences to generate two code sequences corresponding to one frame, and stores them in a secondary storage unit 1108.

One code sequence generated by the code sequence forming unit 1403 is constituted by a header and coded data hierarchically arranged at two levels, namely level 0 and level 1. In this case, the coded data at level 0 is constituted by code sequences from CS(LL, $N_{BP}$(LL)−1) to CS(LL, 0) obtained by coding the coefficients of the subband LL. The coded data at level 1 is constituted by code sequences from CS(LH1, $N_{BP}$(LH1)−1) to CS(LH1, 0), code sequences CS(HL1, $N_{BP}$(HL1)−1) to CS(HL1, 0), and code sequences CS(HH1, $N_{BP}$(HH1)−1) to CS(HH1, 0) obtained by coding the coefficients of the subbands LH1, HL1, and HH1. This code sequence is termed a field code sequence.

Another code sequence generated by the code sequence forming unit 1403 is constituted by code sequences CS(H, $N_{BP}$(H)−1) to CS(H, 0) obtained by coding the coefficients of the subband H. This code sequence is termed a progressive additional code sequence. FIGS. 22A and 22B are views showing the structures of a field code sequence and progressive additional code sequence corresponding to one frame data, which are generated by the code sequence forming unit 1403.

Figure 23:
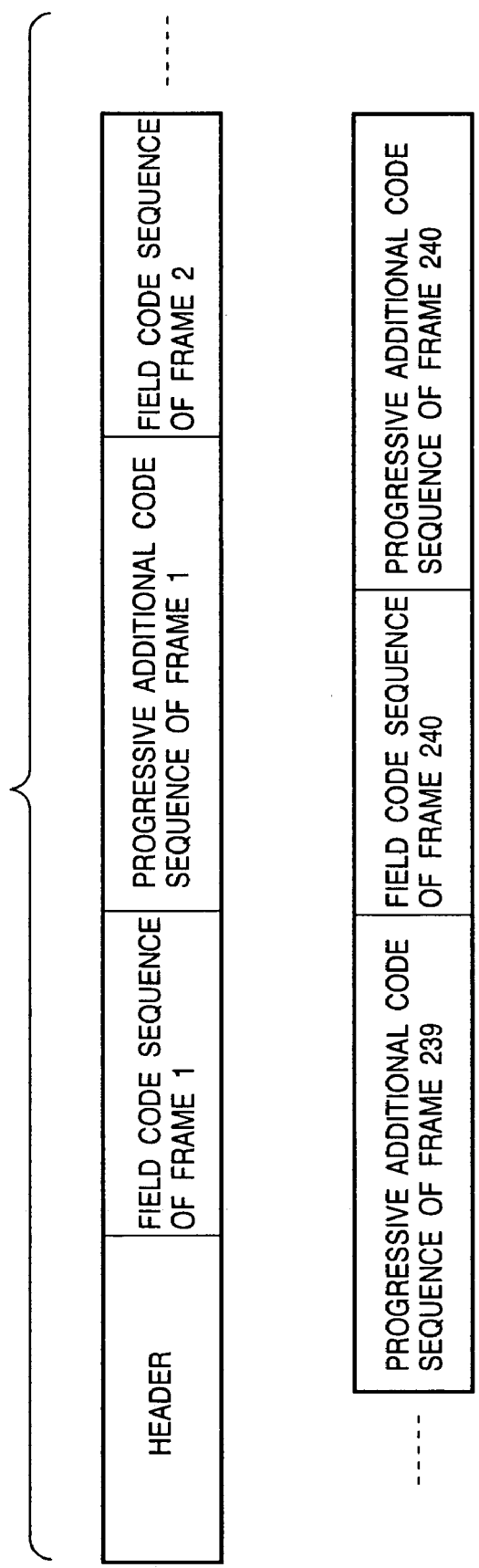
FIG. 23 is a view showing an example of coded moving image data in which the code sequences of the respective frames generated by the code sequence forming unit 1403 are sequentially arranged.

FIG. 23 is a view showing an example of coded moving image data in which the code sequences of the respective frames which are generated by the code sequence forming unit 1403 are sequentially arranged. The start position of the field code sequence of each frame and the length of each code sequence are stored in the header portion of the coded moving image data in FIG. 23 so as to facilitate extraction of data required to play back an interlaced image.

In this embodiment, image data is decomposed first into two frequency bands in the vertical direction, and then each frequency band is decomposed into the same number of frequency bands in the horizontal and vertical directions. This embodiment uses the simple coding scheme for the sake of descriptive convenience. However, by using, for example, a coding scheme based on Part 1 of JPEG 2000, in which the number of components decomposed from a low-frequency component obtained by first decomposition in the vertical direction is limited to the same number in the horizontal and vertical directions, a code sequence conforming to the standard is stored as the field code sequence shown in FIG. 23. This makes it possible to generate coded moving image data which exhibits compatibility among various kinds of moving image coding apparatuses in playing back an interlaced image and allows a special moving image decoding apparatus to play back a progressive image.

That is, the present invention is associated with a moving image coding technique of coding noninterlaced moving image data. More specifically, a predetermined frame of noninterlaced moving image data is frequency-transformed into two subbands in the vertical direction, and one subband is further decomposed into a plurality of subbands. In addition, a frame obtained by shifting the frame next to the predetermined frame by one line in the vertical direction is frequency-transformed to be decomposed into two subbands in the vertical direction. One subband is decomposed into the same number of subbands as that of decomposed subbands, and the frame decomposed into a plurality of subband is coded.

The present invention is not limited to this, and may be applied to a case wherein a luminance value is expressed by the number of bits, e.g., 4, 10, or 12, other than 8, or color image data is used, whose pixel is expressed by a plurality of color components such as R, G, and B components, Y, Cr, and Cb components, or C, M, Y, and K components. The present invention can also be applied to a case wherein when multilevel information representing the state of each pixel in an image area is to be coded or decoded, for example, the color of each pixel is represented by an index value for a color table, and the index value is coded or decoded. Furthermore, the capture time and the number of frames captured per sec are not limited to those in the embodiment described above.

Eighth Embodiment

The present invention is not limited to the above embodiments. For example, in the fifth to seventh embodiments described above, bit plane coding is performed on a subband basis. However, each subband may be further divided into a plurality of blocks, and bit plane coding may be performed on a block basis. Alternatively, one bit plane may be coded in a plurality of passes.

In addition, the method using an MQ-coder has been described as a binary arithmetic coding method. However, an arithmetic coding method using a QM-Coder or the like other than an MQ-coder may be used, or another kind of binary coding scheme may be used as long as it is suitable for coding a multi-context information source.

If there is no need to change the decoded pixel precision stepwise, the coefficients of subbands may be subjected to entropy coding as multilevel data instead of bit plane coding. In addition, a filter for subband decomposition is not limited to the one in the above embodiments, and another kind of filter may be used. Furthermore, the number of times the filter is applied is not limited to that in the above embodiments. The structure of a code sequence is not limited to that in the above embodiments. For example, the order of code sequences and the storage form of additional information may be changed.

Other Embodiment

The present invention may be applied to a system constituted by a plurality of devices (e.g., a host computer, an interface device, a reader, a printer, and the like) or an apparatus comprising a single device (e.g., a copying machine, a facsimile apparatus, or the like).

As is obvious, the object of the present invention is realized even by supplying a recording medium (or a storage medium) storing software program codes for realizing the functions of the above-described embodiments to a system or apparatus, and causing the computer (or a CPU or an MPU) of the system or apparatus to read out and execute the program codes stored in the storage medium. In this case, the program codes read out from the recording medium realize the functions of the above-described embodiments by themselves, and the recording medium storing the program codes constitutes the present invention. Obviously, the functions of the above-described embodiments are realized not only when the readout program codes are executed by the computer but also when the OS (Operating System) running on the computer performs part or all of actual processing on the basis of the instructions of the program codes.

As is obvious as well, the functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

When the present invention is to be applied to the above recording medium, program codes corresponding to the flow charts described above are stored in the medium.

As has been described above, according to the present invention, an interlaced image or progressive image can be efficiently decoded from the coded data of a progressive image.

The present invention is not limited to the above embodiments and various changes and modifications can be made within the spirit and scope of the present invention. Therefore, to apprise the public of the scope of the present invention, the following claims are made.

What is claimed is:

1. A moving image coding apparatus for coding noninterlaced moving image data, comprising:
    input means for inputting noninterlaced moving image data;
    generating means for generating new image data by arranging line data of two consecutive frames in a predetermined order;
    subband decomposing means for frequency-transforming the image data to decompose the data into a plurality of subbands;
    coding means for coding the image data decomposed into the plurality of subbands; and
    output means for outputting the coded image data.

2. The apparatus according to claim 1, wherein said subband decomposing means decomposes the image data into a plurality of subbands by using two-dimensional discrete wavelet transform.

3. The apparatus according to claim 1, wherein said generating means generates new image data by alternately arranging the line data of the two frames upon changing the order.

4. The apparatus according to claim 3, further comprising storage means for temporarily storing the line data of one of the two frames,
wherein said generating means generates new image data by using the line data of one frame of the moving image data which is directly input and the line data of the frame stored in said storage means.

5. The apparatus according to claim 1, wherein said generating means arranges an odd line of an odd frame and an even line of an even frame on the same line, and arranges an even line of the odd frame and an odd line of the even frame on the same line.

6. A moving image decoding apparatus for decoding interlaced image data from coded data of image data in which line data of two consecutive frames are arranged in a predetermined order, comprising:
input means for inputting the coded data;
subband decoding means for decoding a predetermined subband from the coded data;
subband combining means for reconstructing image data by combining decoded subbands;
frame decomposing means for decomposing the reconstructed image data into odd and even fields; and
output means for outputting decomposed frames.

7. The apparatus according to claim 6, further comprising designation means for designating whether coded data of image data in which line data of two consecutive frames are arranged in a predetermined order is decoded by interlacing or noninterlacing,
wherein
if it is designated to perform decoding by interlacing, said input means inputs only coded data containing no predetermined high-frequency component, and
if it is designated to perform decoding by noninterlacing, said input means inputs coded data associated with all frequency components.

8. A moving image coding method of coding noninterlaced moving image data, comprising:
a generating step of generating new image data by arranging line data of two consecutive frames of noninterlaced moving image data in a predetermined order;
a subband decomposing step of frequency-transforming the image data to decompose the data into a plurality of subbands; and
a coding step of coding the image data decomposed into the plurality of subbands.

9. A moving image decoding method of decoding interlaced image data from coded data of image data in which line data of two consecutive frames are arranged in a predetermined order, comprising:
a subband decoding step of decoding a predetermined subband from the coded data;
a subband combining step of reconstructing image data by combining decoded subbands; and
a frame decomposing step of decomposing the reconstructed image data into odd and even fields.

10. The method according to claim 9, further comprising a designation step of designating whether coded data of image data in which line data of two consecutive frames are arranged in a predetermined order is decoded by interlacing or noninterlacing,
wherein
in said subband decoding step, if it is designated to perform decoding by interlacing, a subband is decoded by using only coded data containing no predetermined high-frequency component, and
if it is designated to perform decoding by noninterlacing, a subband is decoded by using coded data associated with all frequency components.

11. A computer-readable medium storing a computer program which, when executed, performs a method for coding noninterlaced moving image data, the method comprising:
a generating step of generating new image data by arranging line data of two consecutive frames of noninterlaced moving image data in a predetermined order;
a subband decomposing step of frequency-transforming the image data to decompose the data into a plurality of subbands; and
a coding step of coding the image data decomposed into the plurality of subbands.

12. A computer-readable medium storing a computer program which, when executed, performs a method for decoding interlaced image data from coded data of image data in which line data of two consecutive frames are arranged in a predetermined order, the method comprising:
a subband decoding step of decoding a predetermined subband from the coded data;
a subband combining step of reconstructing image data by combining decoded subbands; and
a frame decomposing step of decomposing the reconstructed image data into odd and even fields.

* * * * *

UNITED STATES PATENT AND TRADEMARK OFFICE
CERTIFICATE OF CORRECTION

PATENT NO. : 7,302,105 B2
APPLICATION NO. : 10/620604
DATED : November 27, 2007
INVENTOR(S) : Hiroshi Kajiwara It is certified that error appears in the above-identified patent and that said Letters Patent is hereby corrected as shown below:

COLUMN 12

Line 35, ""w"" should read --"0"--.

COLUMN 20

Line 62, "is-an" should read --is an--.

Signed and Sealed this

Fifth Day of August, 2008

JON W. DUDAS
*Director of the United States Patent and Trademark Office*